United States Patent
Hearst

(10) Patent No.: US 6,223,145 B1
(45) Date of Patent: Apr. 24, 2001

(54) INTERACTIVE INTERFACE FOR SPECIFYING SEARCHES

(75) Inventor: Marti A. Hearst, Kensington, CA (US)

(73) Assignee: Zerox Corporation, Stamford, CT (US)

( * ) Notice: Subject to any disclaimer, the term of this patent is extended or adjusted under 35 U.S.C. 154(b) by 0 days.

(21) Appl. No.: 09/200,194

(22) Filed: Nov. 25, 1998

Related U.S. Application Data
(60) Provisional application No. 60/066,960, filed on Nov. 26, 1997.

(51) Int. Cl.[7] .......................................................... G06F 9/45
(52) U.S. Cl. ................................... 703/22; 707/3; 707/4; 707/5
(58) Field of Search .................................. 703/22; 707/3, 707/4, 5; 345/348

(56) References Cited

U.S. PATENT DOCUMENTS

| | | | |
|---|---|---|---|
| 5,295,243 | | 3/1994 | Robertson et al. ................... 395/160 |
| 5,659,766 | * | 8/1997 | Saund et al. .......................... 707/500 |
| 5,687,364 | * | 11/1997 | Saund et al. .............................. 707/6 |
| 5,895,470 | * | 4/1999 | Pirolli et al. .............................. 707/5 |
| 6,094,652 | * | 7/2000 | Faisal ....................................... 707/5 |

OTHER PUBLICATIONS

Hemmje et al., "LyberWorld—A Visualization User Interface Supporting Fulltext Retrieval", Proc. 17th Annual Inter. ACM–SIGIR Conf. on Res. and Dev. in Information Retrieval, pp. 249–259, Jul. 1994.*

Pirolli et al., "Silk from a Sow's Ear: Extracting Usable Structures from the Web", Conf. Proc. Human Factors in Computing Systems, pp. 188–125, Apr. 1996.*

Carriere et al, "Research Report: Interacting with Huge Hierarchies: Beyond Cone Trees", Proceedings Information Visualization, pp. 74–81, Oct. 1995.*

Santucci et al., "A Hypertabluar Visualizer of Query Results", Proc. 1997 IEEE Symp. on Visual Languages, pp—189–196, Sep. 1997.*

Munzner, T., "H3: Laying Out Large Directed Graphs in 3D Hyperbolic Space", Proc. IEEE Symp. on Information Visualization, pp. 2–10, Oct. 1997.*

Sentissi et al., "A Graphical User Interface for Object–Oriented Database", Proc. of the Inter. Conf. of the Chilean Comp. Sci. Society, pp. 227–139, Nov. 1997.*

Veldman, K., "Frontiers in Electronic Media", Interactions, pp. 52–64, Aug. 1997.*

* cited by examiner

Primary Examiner—Kevin J. Teska
Assistant Examiner—Douglas W. Sergent

(57) ABSTRACT

An interactive interface for creating a search query for a corpus of machine-readable documents, each of which is associated with at least one category of a category hierarchy. The interactive interface includes a cone tree generation component, a query specification component, a begin search component, and a query generation component. The cone tree generation component generates and displays a cone tree representing the category hierarchy. The cone tree represents each category of the category hierarchy as a node having a selection object for indicating inclusion of the category in a one of a first group, and a second group. Each selection object is responsive to a cursor control device. The query specification component generates and displays a query specification object including a first group object and a second group object. Each group object is responsive to the cursor control device and indicates members of the group. Each group includes a one of a term included within the corpus and a category of the category cone tree. The begin search component generates and displays a begin search object responsive to the cursor control device. The query generation component generates a query for searching the corpus to find documents that include at least one member of the first group and at least member of the second group.

2 Claims, 19 Drawing Sheets

INTERACTIVE INTERFACE FOR SPECIFYING SEARCHES

CROSS-REFERENCE TO RELATED APPLICATION

The present application claims the benefit of U.S. Provisional Application No. 60/066,960, filed Nov. 26, 1997.

FIELD OF THE INVENTION

The present invention relates to an interactive interface. More particularly, the present invention relates to an interactive interface for specifying search queries.

BACKGROUND OF THE INVENTION

A. Organizing Retrieval Results

Increasingly, the public accesses text collections and their information electronically, identifying desired documents by submitting a search query. The standard approach for displaying search results for electronic text collections is to present, in ranked order, a list of document titles. Often shown alongside each title is a numerical score signifying the degree of match between the document and the query, or the estimated relevance of the document to the query. On-line bibliographic systems show meta-data about the documents, such as author and publisher, alongside the title. Search engines associated with the World Wide Web commonly show short summaries or excerpts from the retrieved documents, typically extracted from the first few lines. Some systems show lines extracted from the document that match terms in the query. Document titles can also be annotated with graphics that show the correspondence between the retrieved documents and the query.

Use of category taxonomies to impose organization upon retrieval results has received little attention, even though some are associated with valuable document collections. For example, the Association for Computing Machinery (ACM) has developed a hierarchy of approximately 1200 category labels and authors are required to assign multiple categories from this taxonomy to their journal articles. Indexers for major medical journals use the MeSH (Medical Subject Headings) taxonomy of over 18,000 main subject headings to annotate articles. Category taxonomies like these are arranged in a hierarchy meant to reflect the set of concepts that define the field. For this reason, those who know the relevant domain easily understand the associated categories. Categories are restricted to a fixed set and so help reduce the space of concepts by which documents can be characterized. Categories can summarize a document's contents and by virtue of being assigned to a document, or not, distinguish those concepts that are discussed at length versus those just touched in passing.

Little use has been made of category labels in conjunction with the presentation and organization of retrieved documents other than to simply list the associated categories. Simply listing categories associated with documents is inadequate in a number of situations. One such is when many documents are assigned to a particular category so that the category does not differentiate between the retrieved documents. Another such is when many categories are associated with a set of retrieved documents so that higher level commonalties among the categories are not represented. Thus, the available categories do not capture the main themes of the retrieved documents. Finally, the categories available may not be adequate because they do not characterize the information in a way that interests the user.

Yahoo's search engine for the World Wide Web provides category labels which users may use to issue search queries. These category labels are presented as an alphabetical list, with no indication of the relationship of the categories to one another, forcing users to read through them one by one. This poor presentation of the hierarchy frustrates a user when the predefined categories do not meet the user's needs. The user is forced to either navigate through irrelevant portions of the hierarchy or abandon use to the hierarchy altogether, issuing instead a search on the topic of interest.

The problems just discussed are exacerbated when documents are best characterized by multiple category labels. For example, a document whose title is "Immediate breast reconstruction after mastectomy" is not about either breast reconstruction or mastectomy alone, but about the conjunction of these topics. Each of the constitutive topics could occur without the other. There are many different ways that topics like these can combine that, for a large category set, navigating a structure containing all potential combinations is untenable.

Thus, an unfulfilled need exists for a means of using categories to specify search queries. Another unfulfilled need exists for a means of using categories to display search results when the retrieved documents are associated with category labels. This need is greater when each retrieved document is associated with many category labels.

B. The Cone Tree

A method for generating a cone tree using a computer system is described in detail in U.S. Pat. No. 5,295,243 to Robertson et al. entitled "Display of Hierarchical Three-Dimensional Structures with Rotating Substructures." Displayed on the monitor of a computer system, the cone tree is perceived by computer user as three-dimensional. Briefly described, the cone tree provides a three-dimensional node-link structure with a hierarchical geometry within which the relative positions of nodes and links, as viewed from the primary viewing position in front of a computer monitor, can change without losing the perceived constancy of the structure as a whole. When a user selects a part of the structure, the selected part can be brought to a primary viewing position by changing the geometry of the structure without loss of object constancy.

FIG. 1 illustrates a three dimensional, horizontally oriented, hierarchical structure 60 displayed on a computer monitor. Structure 60 has conic substructures that can rotate while preserving object constancy. Structure 60 includes conic substructures 62, 64, 66, 68 and 70 in hierarchical levels. Several cues within structure 60 allow a human eye to perceive it as three-dimensional. For example, the bases or directories of the conic substructures, illustratively elliptical as can be seen from base 72 of conic substructure 62, are perceptible as tilted circles receding from the viewing point. Also, the links, illustratively of different lengths as can be seen from links 74 and 76, are perceptible as having equal length due to some links being closer to the viewing point than others. The nodes, illustratively including selectable units of different sizes as can be seen from nodes 78 and 80, are perceptible as of equal size dues to some nodes being closer to the viewing point than others.

An image of structure 60 on a computer monitor could be followed by a sequence of images in which each of the conic substructures is replaced by a series of similar conic substructures that are perceptible as slightly rotated continuations, rotating about horizontal axes. For example, if a user indicated node 82 and requested that it be moved to the primary viewing position closest to the viewer, conic substructures 70, 68, 66 and 62 could rotate to move node 82 to the requested position. Viewing structure 60 from above, the rotation to move node 82 to the primary viewing position could be as follows: Substructures 70, 68 and 66 could rotate counterclockwise. Substructure 62 could rotate clockwise. These rotations could be concurrent, and continue until links 84, 86, 88 and 90 are all aligned toward the primary viewing position.

The user can request that a node be moved to the primary viewing position by selecting that node's selectable unit. Node 100, in addition to including selectable unit for requesting that it be moved, includes selectable unit 102, called a grow tab. By selecting a grow tab the user requests presentation of the children nodes of the selected node, which are not displayed while the grow tab is displayed. This explains why node 96 does not include a grow tab in FIG. 1—children nodes 94 and 95 are already displayed.

For additional discussion of the cone tree and it implementation in a computer system refer to U.S. Pat. No. 5,295,243.

C. The WebBook

A book metaphor is used to browse a list of linked documents in U.S. Ser. No. 08/525,936 to Robertson et al. entitled "Display System for Displaying Lists of Linked Documents." Briefly described, an interactive interface, called the WebBook, presents a list of pages to a viewer of a computer monitor in a book metaphor, thus conveying a relationship between the different pages. Each page in the WebBook represents a page in the list of linked documents.

FIG. 2 illustrates the computer instructions 100 for generating and using the WebBook with a computer system. The first step 101 is to generate or otherwise obtain a list of Web Pages. This can be accomplished in various ways. One way is to analyze a page, such as a home page, and follow and download all the relative links on the home page. This is repeated for each subsequent page. Following relative links is useful since these pages will typically be closely related. Each page on a chain of relative links would then be included in the set of pages. Variations on this would limit the number of relative links traversed. This list of pages will be in the order that they would appear in the book.

Next, during step 102, page objects for each web page are generated. A page object is the internal representation of a web page for use in the book metaphor. Page objects and their contents are described in greater detail below. Next, during step 103 the WebBook is generated from the page objects. The WebBook has a basic structure which lists the pages and provides various controls. When a user opens the WebBook, during step 104 the WebBook rendered by the computer controlled display system and displayed on a display. The first time the book is opened, the cover will be displayed, or alternatively a first page (depending on whether the book has a cover). Subsequent instances of opening the book will cause it to be opened at the point where it was last closed. As will be described in detail below, only those pages corresponding to a particular page in a book are visible. Other page objects are marked as not displayed.

The user during step 105 then traverses the WebBook using page turning operations and marking interesting pages until through viewing or using the WebBook. The page turning operations are animated so as to give the user a sense of an actual page turning. When the user is done, the page in the WebBook last open is marked in the WebBook, step 106, and WebBook is closed, step 107. Optionally, during step 108 the WebBook may be stowed. Stowing the WebBook is equivalent of putting a book on a bookshelf.

WebBooks themselves may be organized as collections and stored as icons on a bookshelf. This would permit the storing of multiple WebBooks each having their own related subject. WebBooks may also be transferred and used by other users. Finally, pages may be added to a WebBook. This would require creation of a page object(s) for the added page(s) and regeneration of the WebBook.

FIG. 3 illustrates a WebBook as displayed on a display of a computer system. The WebBook 110 includes a first page 112 and a second page 113, each having an identical structure. The first page 112 is an instance of a left page and the second page 113 is an instance of a right page. Pages 112 and 113 each includes links 111 to other pages within the WebBook. As is typical, links 111 are indicated by underlined text. For example, clicking on link 111*a* opens the WebBook to a page containing a paper about cone tree visualization. Vertical scroll bars 114 and 115 provide for vertical scrolling on their respective pages. Horizontal scroll bars 116 and 117 provide for horizontal scrolling on their respective pages. Superimposed within the horizontal scroll bars are page references 132 and 133 which indicate the page number in the book for each page. Scaling bars 118 and 119 enable font scaling on the respective pages. Each of the pages also has a title bar 120 and 121 which is used to indicate the title of the respective page. The content and layout of the page is determined by the HTML macros defining the page.

Book control buttons are presented at the bottom edge of the WebBook 110. Close button 122 provides for closing the book. Back button 123 provides for looking at a prior page. History button 124 provides for reviewing the history of pages looked at. Mark button 125 provides for creating a bookmark for a page being viewed. Illustrated in FIG. 3, bookmark 130 indicates that page 14 has been marked. Help button 126 provides for invoking various help functions for the WebBook 110. The help functions are in the form of text describing how to perform particular functions in the WebBook. Options button 127 provides for specifying various operational parameters in the WebBook. An example is specifying the timing for flipping pages in the WebBook. Labeled "Scan <", button 128 provides for automatic scanning of pages to the lower numbered pages. Labeled "Scan >", button 129 provides for automatic scanning of pages to the higher numbered pages. Re-sizing boxes 131 may be used to re-size the WebBook 110 using a point and drag function.

Finally, book edge areas 132 and 133 are used to provide a visual indication of relative positioning within the book, e.g. the number of pages on that "side" of the book. The book edge areas 132 and 133 will change in size as the pages are traversed. Also, the book edge areas may be used as a means for directly accessing pages in the book (e.g. mimicking the activity of thumbing through the book in groups of pages). This is accomplished by a point and click operation pointing to the edge.

Referring to FIG. 4 when displayed with a cover, the contents of the WebBook is hidden. Display of a cover may be useful for security purposes, wherein a password or other security mechanism may be required before the book may be opened. Further, when displayed with a cover, the first page will be a left page in the WebBook because when opened two pages are displayed.

C.1. Generating a List of Pages

A list of pages for the WebBook can be obtained in any one of many ways. As mentioned above, one way is to gather all the relative links that originate from a particular home page. It has been determined through observation that the use of relative links is a common indicator of pages that are related. This is because the use of relative links makes a collection of pages easily transportable (e.g. to move the pages from one server to another). During this process of following the relative links, each page is retrieved and stored. In this technique the pages would be ordered so as to retain relationships. In other words, for a first relative link on a home page, all subsequent relative links are ordered sequentially. They would be followed by a second relative link on the home page followed by all its subsequent relative links. This ordering will allow related pages to be grouped sequentially within the WebBook. An exception is that relative links that are specified two or more times are represented in the list only once (e.g. typically the home page is specified on each page).

Other techniques for creating lists of pages may be used so long as they produce a list that is ordered in the way that the pages would appear in the WebBook.

C.2. WebBook

The WebBook is created from the list of page objects. The WebBook is merely a control structure for manipulating and controlling the page objects. The page objects are positioned in a 3-D space so that that they are co-planer.

The WebBook data structure is dynamic and changes as the book is changed. Preferably, object oriented programming techniques are used to realize the WebBook. So the data structure represents a WebBook object in that context. In any event, the data structure is comprised of a graphical control portion, a list of page objects and WebBook status information. The graphical control portion contains various information for controlling interactive graphical objects. Such information includes transient properties for animation control, 3-D rendering information and a list of "children" objects. The children objects are graphical objects that are manipulated when the WebBook is manipulated. Such objects would include page objects and the graphical objects representing the control buttons and page markers. The list of page objects is merely a page sequence reference to the page objects. The WebBook status information contains various information about the state of the WebBook at a point in time.

The information contained in the objects further specify software routines which utilize the information contained in the object to actually perform the desired function.

C.3. Page Object

FIG. 5 illustrates a page object, a left page object specifically, from a spatial perspective. This figure shows a page object as a plane 141 in 3-D space with respect to axes 144. The plane 141 represents the actual "page" of information on which content is displayed. The plane 141 has associated with it content 142 and an axis of rotation 143 along the right edge (from the viewers perspective). The axis of rotation 143 indicates where the page will be turned (i.e. the spine of the WebBook). The content 142 is the HTML formatted text and image information for the page. FIG. 6 illustrates a right page object. Plane 151 has associated with it content 152. The significant difference is that the axis of rotation 153 is on the left edge of the plane (from the viewers perspective). So when the page turns, it will occur in the opposite orientation then for a left page. For each page object, the content is rendered onto the plane. Generally, the plane is the size of the book (which can be re-sized by the user), so the user will scroll through the content.

A visually appealing aspect of the WebBook is the turning of pages, which is animated. This provides the user with a visual effect approximating the physical activity of turning a page in a book. Generally, the sequence of steps is to rotate the page to be turned about the axis of rotation, rotate the page on the other side of the page to be turned about the axis of rotation, at a point orthogonal to the viewer turn off the page to be turned and turn on the page on the other side, turn off the page being covered, and turn on the new page being revealed by the page turn.

Page "turning" may be accomplished in various ways. One is through a point and click operation on a page or page edge using a cursor control device. In the currently preferred embodiment, pointing and clicking on the left page (or left page edge) will cause the next lower pair of pages to be turned to. Conversely, point and clicking on the right page (or right page edge) will cause the next higher pair of pages to be turned to. Of course other means of interacting with the page, e.g. the use of gestures such as drag cursor left or drag cursor right could be used to implement page turning in the corresponding direction. Page turning may also occur through use of the scan operation provided with the WebBook. The scan operation will cause the pages to turn at a predetermined rate.

FIGS. 7 and 8 illustrate the steps in a page turn. Referring to FIG. 7, a page turn operation of page 113 of FIG. 3 has been initiated. Although not illustrated a first step in accomplishing a visually pleasing page turn is to offset page 113 with the page being revealed. It has been determined that during a page turn, if the pages become co-planer, the content of the page being turned becomes jumbled. This is because the page being revealed two pages hence or before has content that is also being revealed. In any event, as page 113 rotates along an axis 162 corresponding to the spine of a book, page 161 is being revealed. Note that page 113 remains in a rigid plane as it turns. As noted above, the user may modify the speed at which this turn occurs. Referring to FIG. 8, at a point in the rotation of page 113 its "other side", page 163 becomes visible. Page 161 also appears. At predetermined points during the page turn, the content of pages 112 and 113 are turned off indicating that the page is turned. Although not illustrated, the rotation of pages continues until pages 161 and 163 are revealed, completing the page turn animation.

During a page turn, two page objects rotate. Conceptually, left and right pages are positioned back to back. So a page turn involves rotating each in unison to simulate the actual turning of a page.

The animation sequence for turning pages or ruffling pages is generally the same. Ruffling can be thought of as multiple concurrent page turns. FIG. 9 illustrates a step in the ruffling through the pages of a WebBook, during which a plurality of pages are being turned concurrently. A difference in ruffling is that intermediate pages are never fully visible to the user since it is quickly being overlaid by a next page. Ruffling in the currently preferred embodiment is invoked by pointing to a page and holding down the button on the cursor control device for at least a predetermined time. When the button associated with the cursor control device is released, the ruffling will stop.

SUMMARY OF THE INVENTION

The interactive interface of the present invention possesses a number of advantages. The interface of the present invention provides users with a fluid, flexible two-way interaction between documents and categories when generating search queries. This interaction aids users by suggesting related, unanticipated category labels in their defining context. Further, when category labels associated with a document are unfamiliar, their meaning can be deduced by examining other category labels higher in the hierarchy. The interactive interface of the present invention also provides user with multiple avenues for interaction. Users can click on category labels on link pages of a SearchBook and cause the corresponding category of a Cat-a-Cone, a labeled cone tree representative of the hierarchy of category labels, to rotate to a primary viewing position. The animation of the movement of the Cat-a-Cone helps users retain the context of categories.

The interactive interface of the present invention allows users to create a search query for a corpus of machine-readable documents, each of which is associated with at least one category of a category hierarchy. The interactive interface includes a cone tree generation component, a query specification component, a begin search component, and a query generation component. The cone tree generation component generates and displays a cone tree representing the category hierarchy. The cone tree represents each category of the category hierarchy as a node having a selection object for indicating inclusion of the category in a one of a first group, and a second group. Each selection object is responsive to a cursor control device. The query specification component generates and displays a query specification object including a first group object and a second group object. Each group object is responsive to the cursor control device and indicates members of the group. Each group includes a one of a term included within the corpus and a category of the category cone tree. The begin search component generates and displays a begin search object responsive to the cursor control device. The query generation component generates a query for searching the corpus to find documents that include at least one member of the first group and at least member of the second group.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION OF THE PREFERRED EMBODIMENTS

Figure 1:
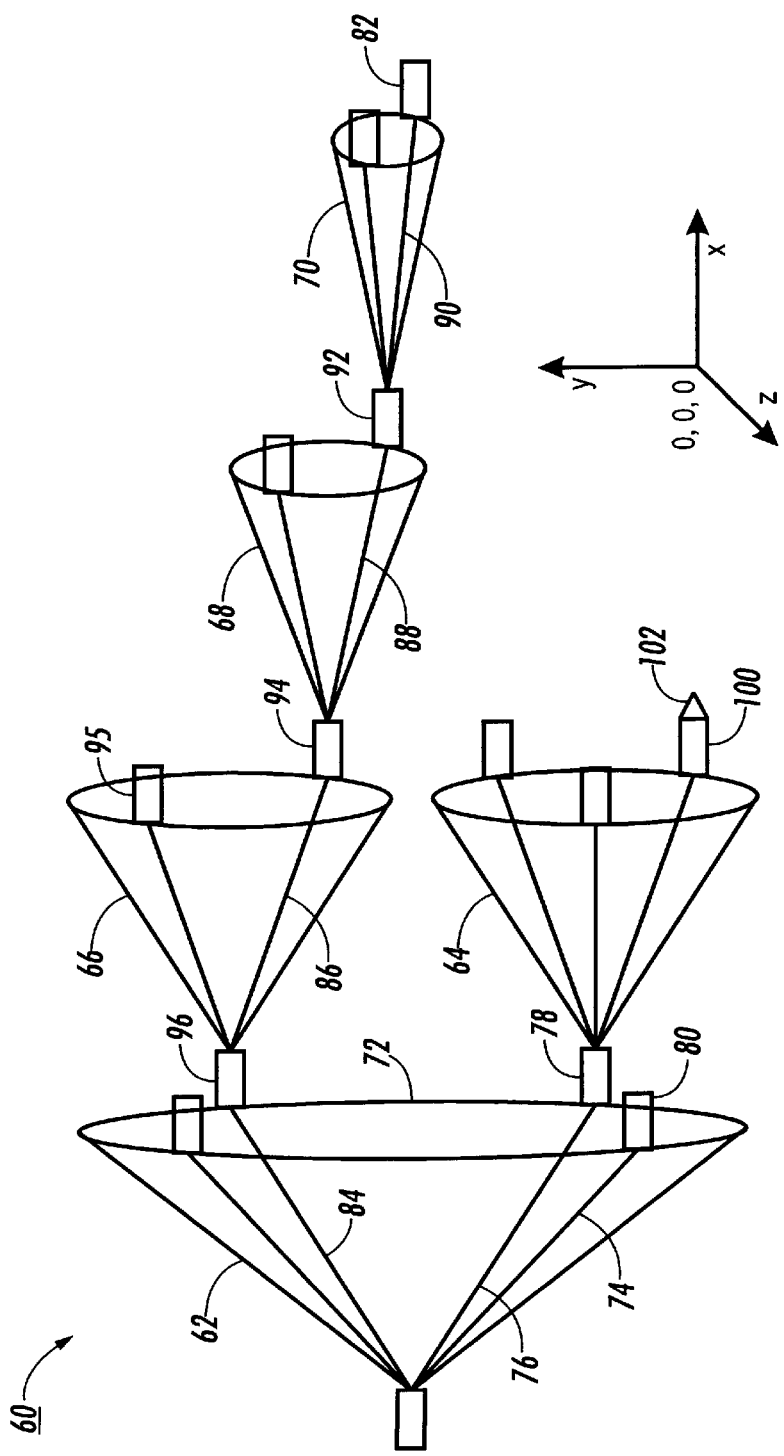
FIG. 1 illustrates a prior hierarchical three-dimensional structure.
Figure 2:
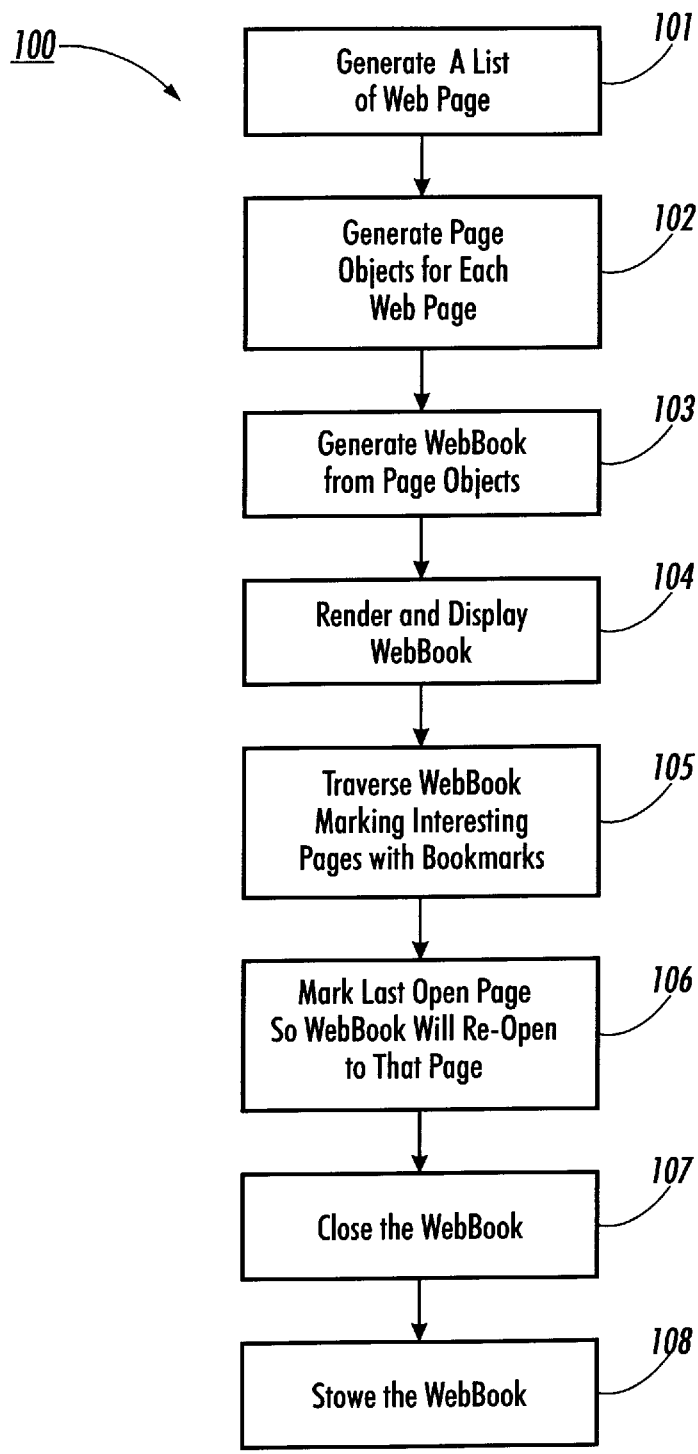
FIG. 2 illustrates computer instructions for a prior WebBook.
Figure 3:
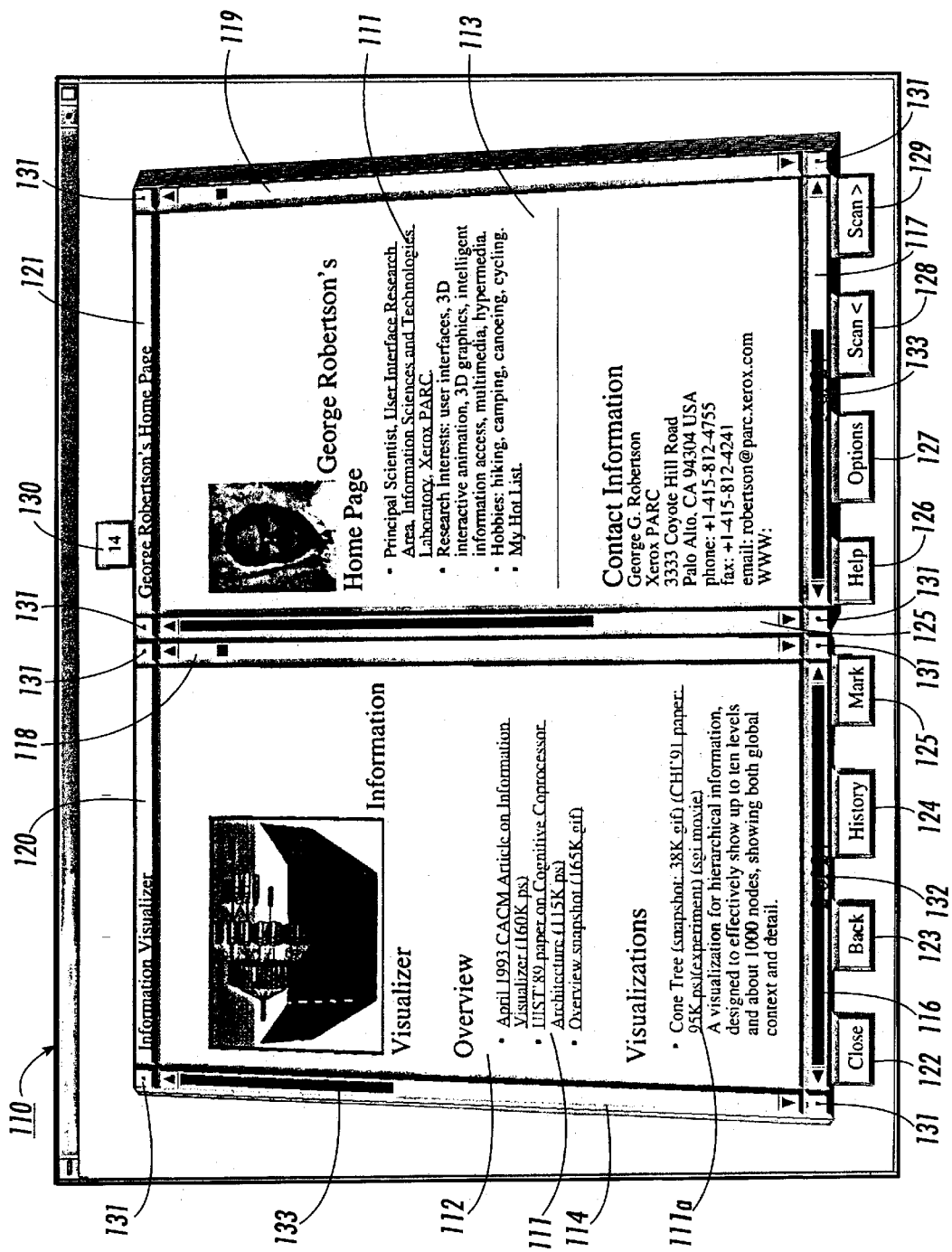
FIG. 3 illustrates a prior WebBook as displayed on a computer monitor.
Figure 4:
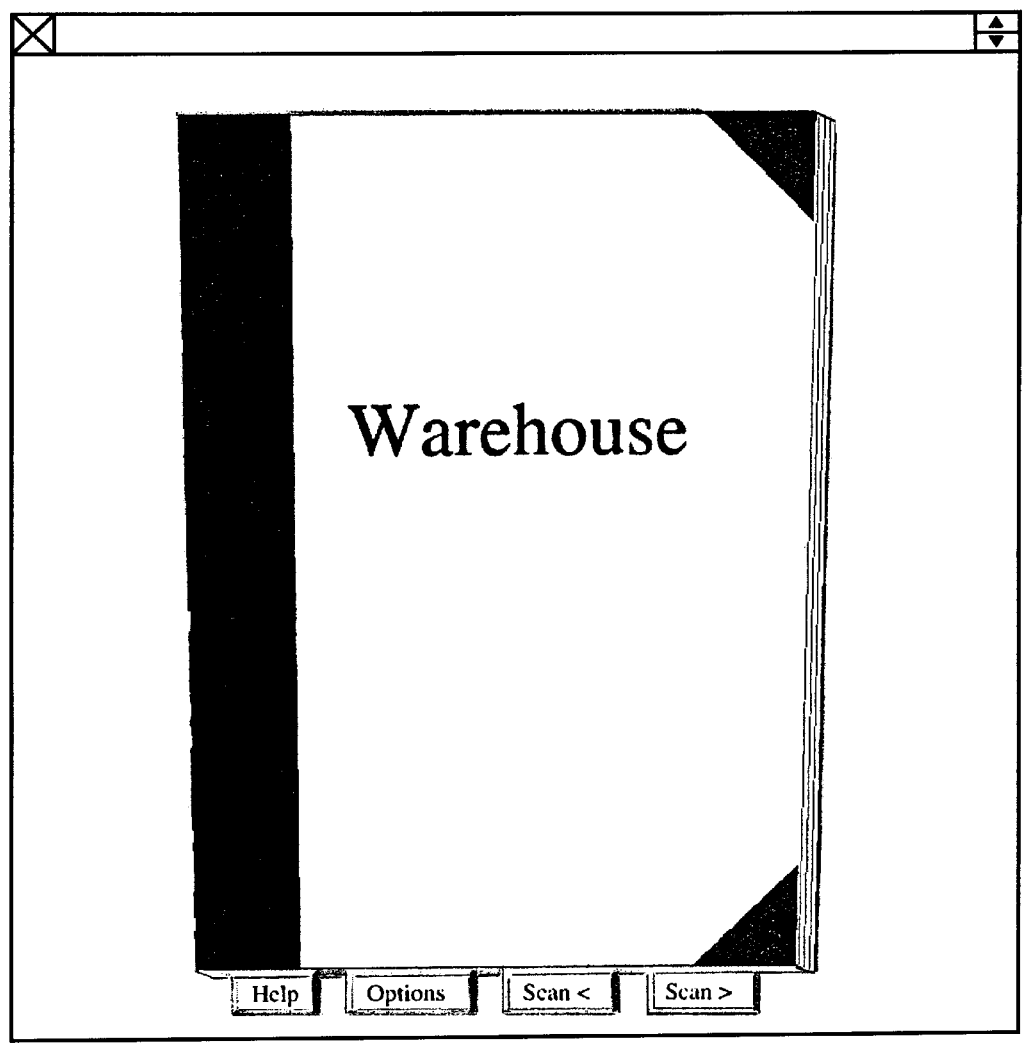
FIG. 4 illustrates a prior cover for a WebBook.
Figure 5:
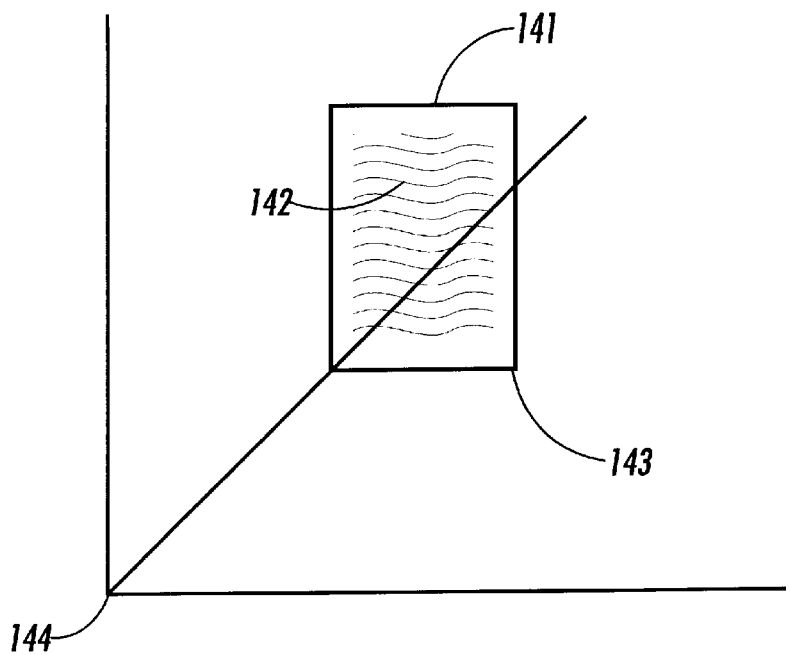
FIG. 5 illustrates a prior left page object.
Figure 6:
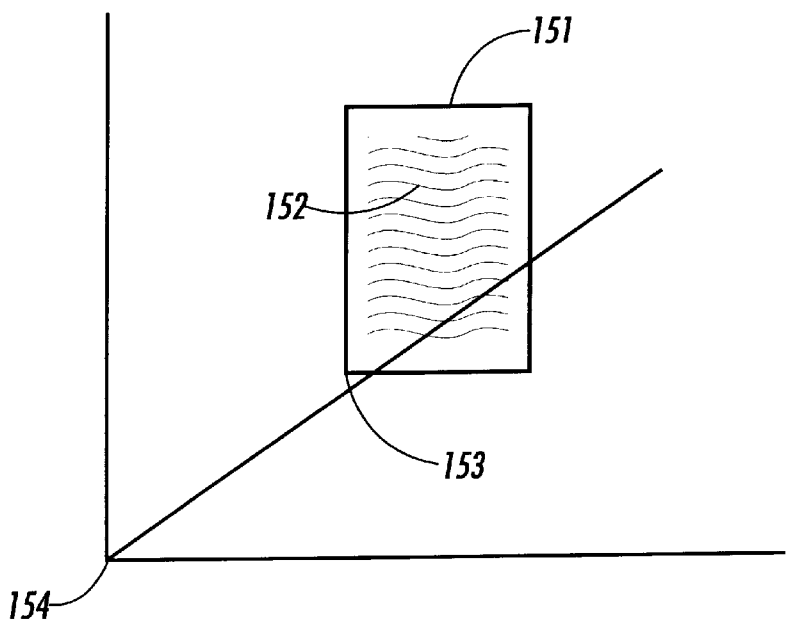
FIG. 6 illustrates a prior right page object.
Figure 7:
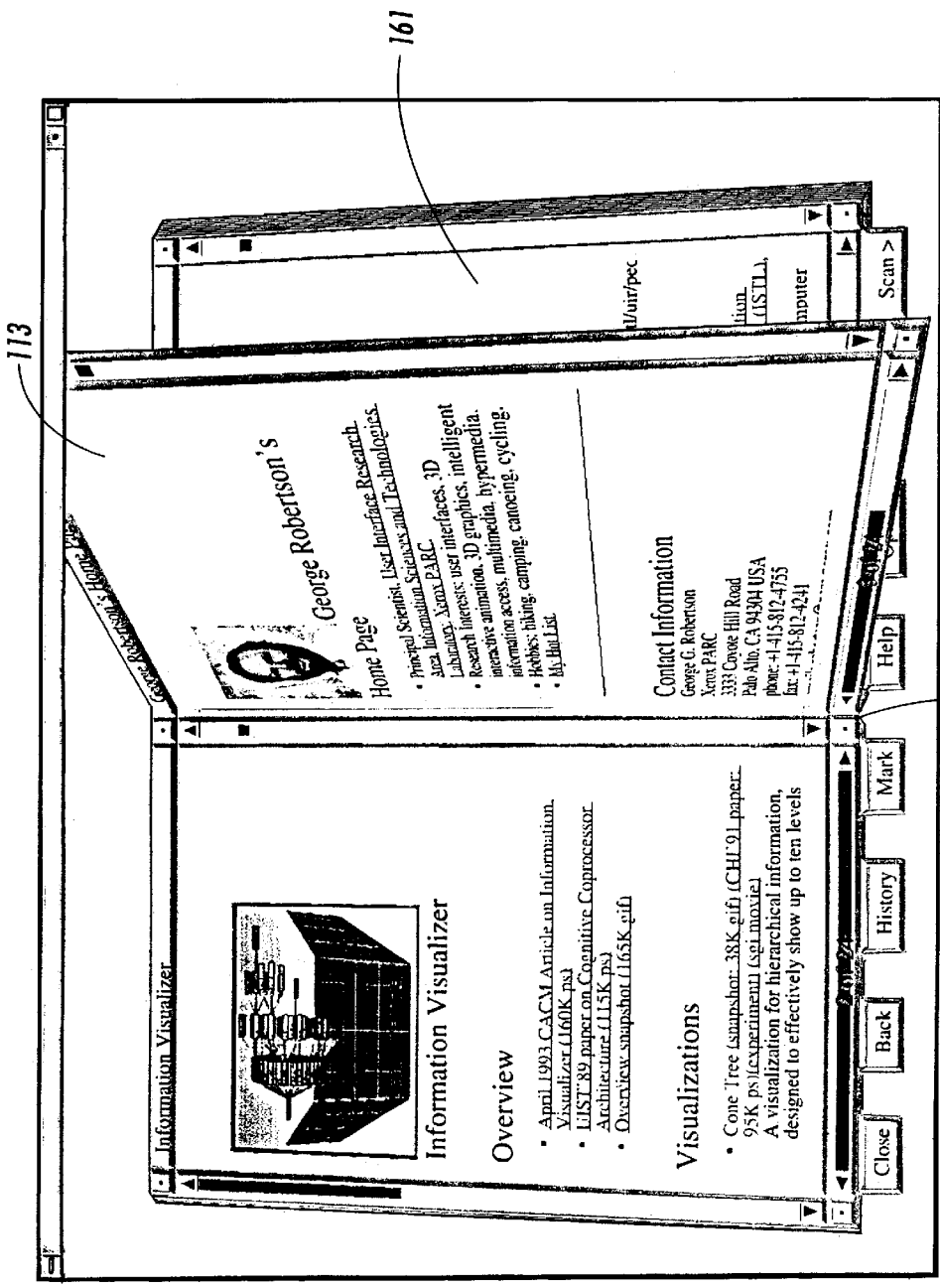
FIG. 7 illustrates a first step in a prior page turn operation.
Figure 8:
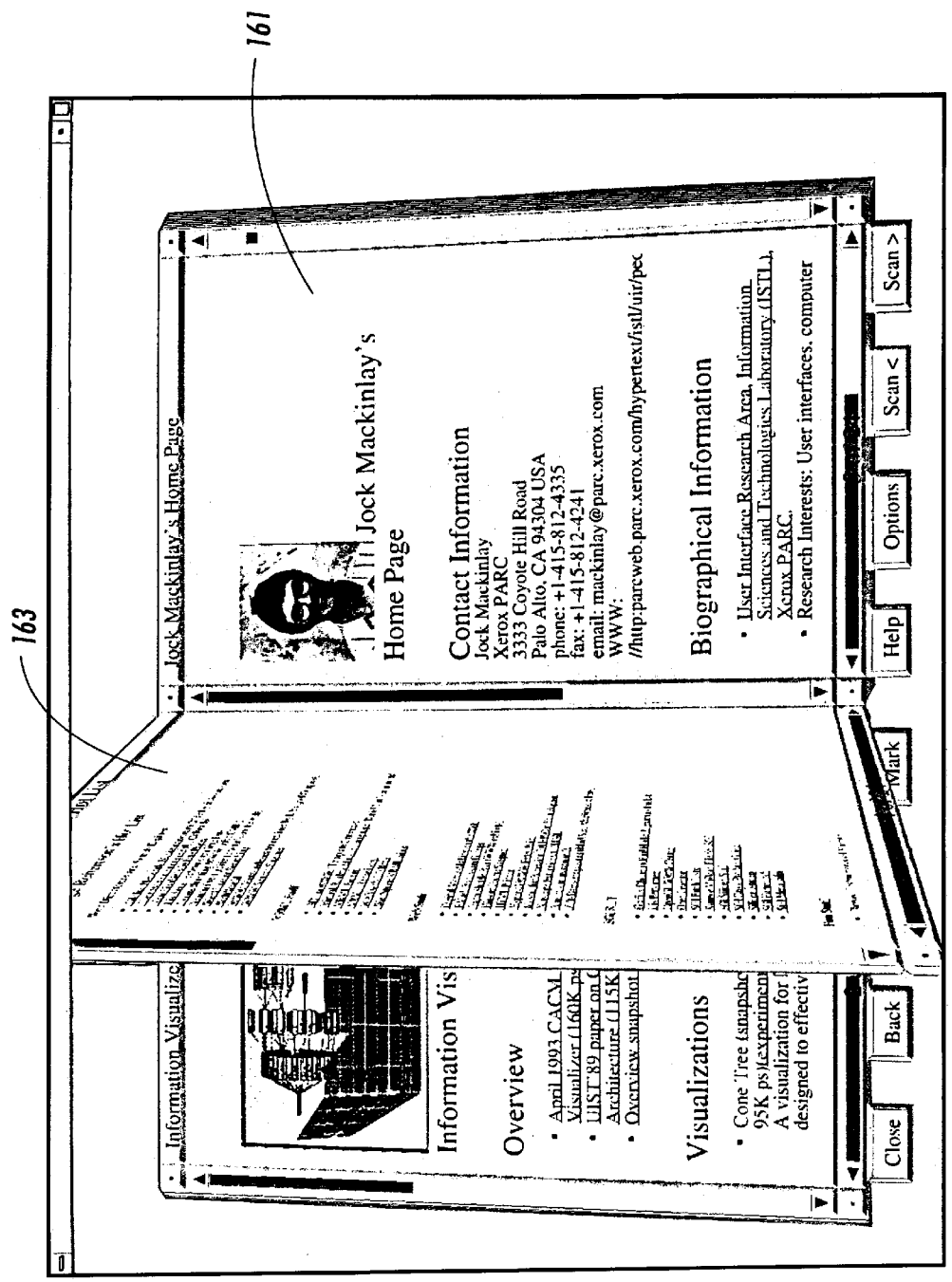
FIG. 8 illustrates a second step in a prior page turn operation.
Figure 9:
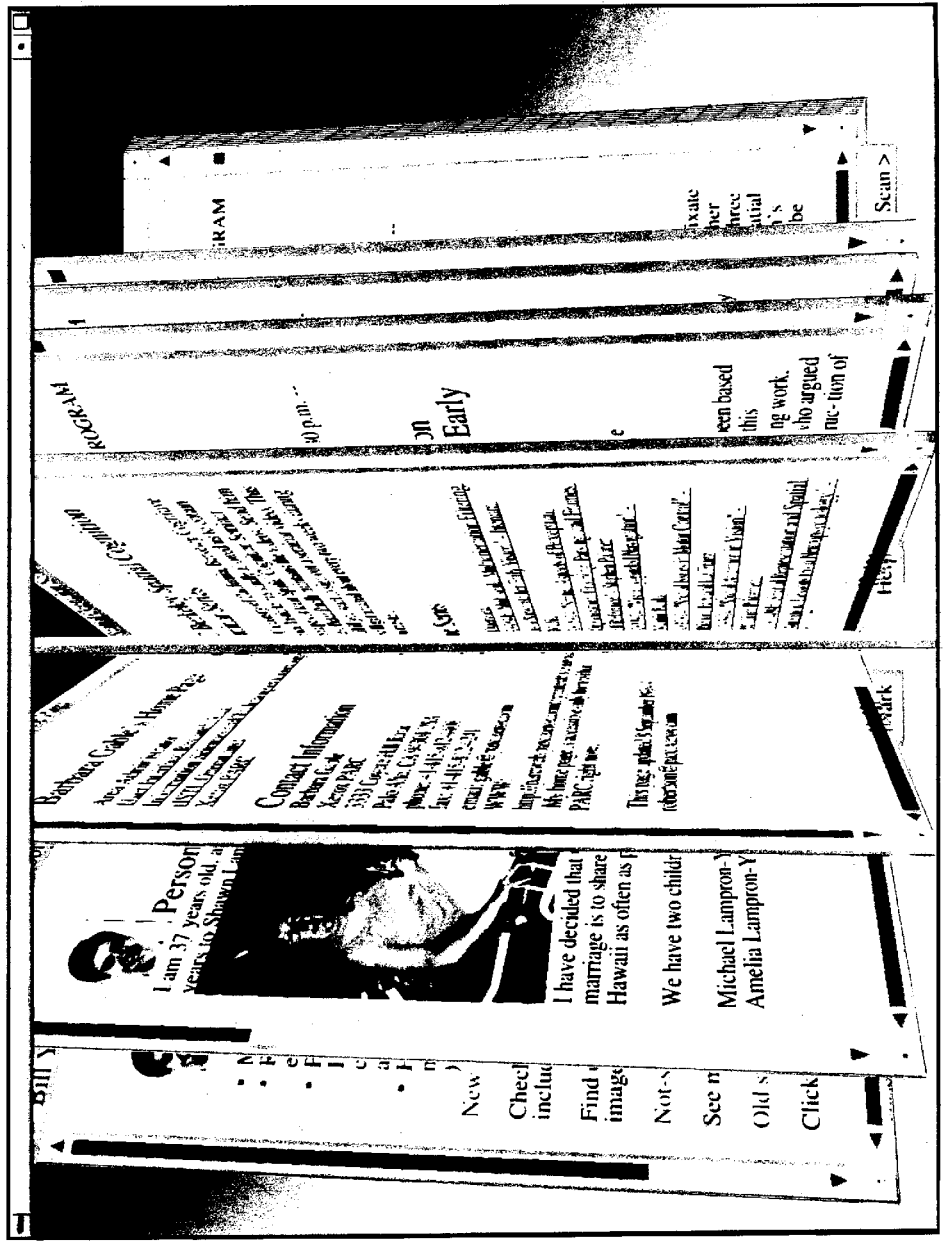
FIG. 9 illustrates a step in a prior ruffle operation.
Figure 10:
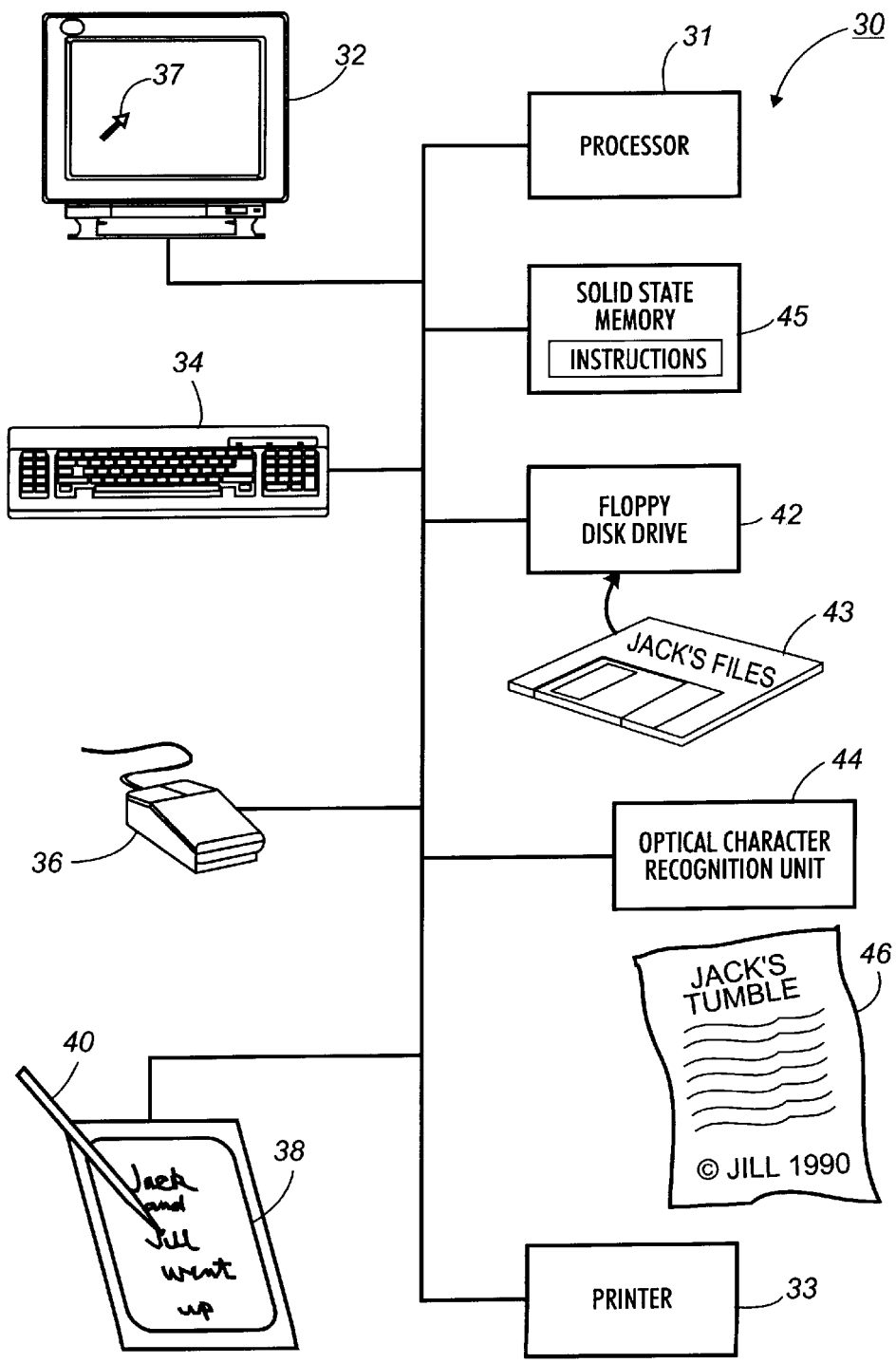
FIG. 10 illustrates a computer system for implementing the interactive user interface of the present invention.

FIG. 10 illustrates in block diagram form computer system 30 in which the interactive user interface of the present invention is implemented by executing instructions 200. Instructions 200 alter the operation of computer system 30 enabling presentation of an interactive user interface for specifying search queries for a document corpus associated with a large category hierarchy. Briefly described, the interactive interface uses information visualization technology to better and separately represent a categorical hierarchy. The interactive interface of the present invention includes a Cat-a-Cone, a query specification object, and a begin search object. The Cat-a-Cone, as suggested by its name, is a cone tree that separately represents a categorical hierarchy independent of a corpus of documents with which it is associated. The Cat-a-Cone represents each category of the category hierarchy as a node, each of which has a selection objection to indicate whether the category is to be included as a member of a first group or a second group. The query specification object looks like a book cover and includes a multiplicity of group objects, or group windows. Using a mouse or other cursor control device, the user may insert into the group object the text terms to be grouped together. While a group object is active, the user may also use the mouse to select categories of the Cat-a-Cone to be included in the same group. The user indicates the query is complete by clicking on the begin search object, or search button. In response, the system generates a search query for all documents in the corpus that include at least one member of each group. Afterward, the search query is presented to a search engine.

A. A Computer System with an Interactive Interface for Specifying Searches and Viewing Retrieval Results Prior to a more detailed discussion of the present invention, consider computer system 30. Computer system 30 includes monitor 32 for visually displaying information to a computer user, as well as a graphical user interface. Computer system 30 also outputs information to the computer user via printer 33. Computer system 30 provides the computer user multiple avenues to input data. Keyboard 34 allows the computer user to input data to computer system 30 by typing. The computer user may also input information to computer system 30 by writing on electronic tablet 38 with a stylus 40 or pen. Alternately, the computer user can input data stored on a magnetic medium, such as a floppy disk 43, by inserting the disk into floppy disk drive 42. Scanner 44 permits the computer user to input an electronic, binary, representation of hard copy of the image of document 46

Yet another avenue for the user to input information to system 30 is mouse 36. By moving mouse 36 the computer user is able to move pointer 37, displayed on monitor 32. The graphical user interface (GUI) enables the user to use mouse 36 to perform operations like "point and click." A "point and click" operation is one where cursor 37 is positioned over a desired area of monitor 32, such as an icon, using mouse 36. Once cursor 37 is appropriately positioned, a button/switch associated with mouse 36 is quickly depressed and released. These "mouse-up" and "mouse-down" events create electrical signals that cause predetermined and context dependent operations to occur. Other operations supported the icon, mouse combination include a "drag" where the button/switch is depressed to "pick-up" and move an icon and released to "drop" the icon.

Processor 31 controls and coordinates the operations of computer system 30 to execute the commands of the computer user. Processor 31 determines and takes the appropriate action in response to each user command by executing instructions stored electronically in memory, either memory 45 or on a floppy disk 43 within disk drive 42. Typically, operating instructions for processor 31 are stored in solid state memory, allowing frequent and rapid access to the instructions. Semiconductor logic devices that can be used to realize memory include read only memories (ROM), random access memories (RAM), dynamic random access memories (DRAM), programmable read only memories (PROM), erasable programmable read only memories (EPROM), and electrically erasable programmable read only memories (EEPROM), such as flash memories.

B. Interactive Interface for Specifying Search Queries

B.1. Generating the Interactive Interface for Specifying Search Queries

Figure 11:
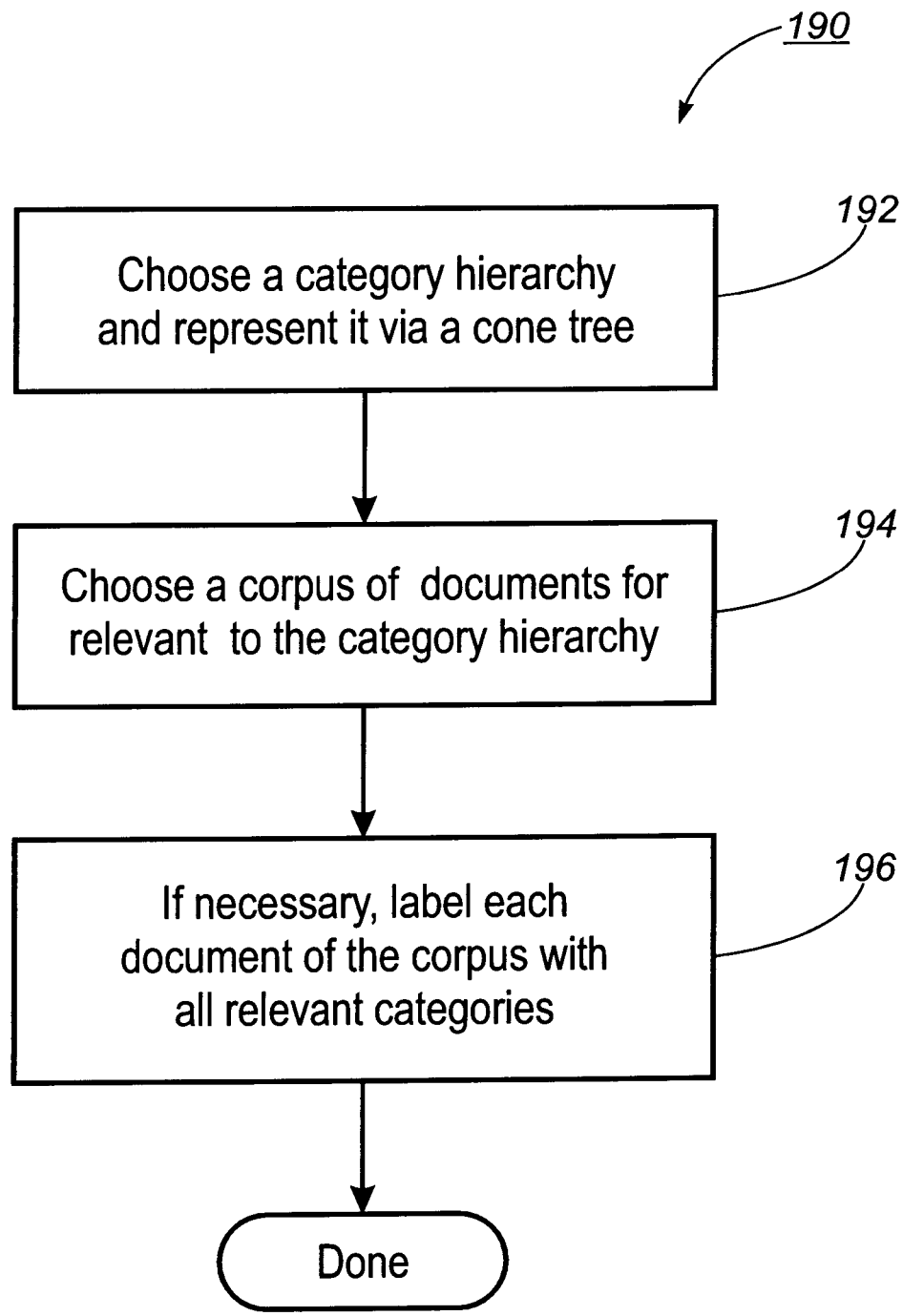
FIG. 11 illustrates instructions for enabling a computer system to support an interactive interface for specifying search queries using a categorical hierarchy.

FIG. 11 illustrates in flow diagram form preparations 190 to ensure that computer system 30 can support the interactive interface of the present invention for specifying search queries. Users of computer system 30 must select both a categorical hierarchy, step 192, and a large corpus of machine-readable documents to which that categorical hierarchy is relevant, step 194. For example, medical personnel doing computerized text searches may find useful the MeSH categorical hierarchy while searching MedLine, a large collection of medical journals. The particular categorical hierarchy and corpus of documents chosen does not effect the interactive interface of the present invention. Any categorical hierarchy and document corpus may be chosen during steps 192 and 194, so long as they are relevant to each other.

After the categorical hierarchy is chosen, during step 192 a cone tree is created and labeled with the category names, thus enabling separate visual representation of the categorical hierarchy associated with the chosen corpus. U.S. Pat. No. 5,295,243 to Robertson et al. entitled "Display of Hierarchical Three-Dimensional Structures with Rotating Substructures", which is incorporated herein by reference, describes a cone tree and its creation. This labeled cone tree is called Cat-a-Cone herein. Labeling a cone tree with category labels to create a Cat-a-Cone is obvious to one of ordinary skill in the computer and, therefore, will not be described in detail herein. Computer system 30 is now able to provide user with a separate visual representation of the categorical hierarchy that is perceptible as three-dimensional.

After selecting the corpus of documents during step 194, additional work may be necessary. If the corpus is not already in machine-readable form, then it must be converted and stored in memory. Further, if the documents of the corpus do not already include category labels, then during step 196 at least one category label must be associated with each document. Preferably, multiple category labels, if relevant, are associated with each document of the corpus. Upon completion of preparations 190, computer system 30 is ready to support the interactive query specification interface of the present invention.

Figure 12:
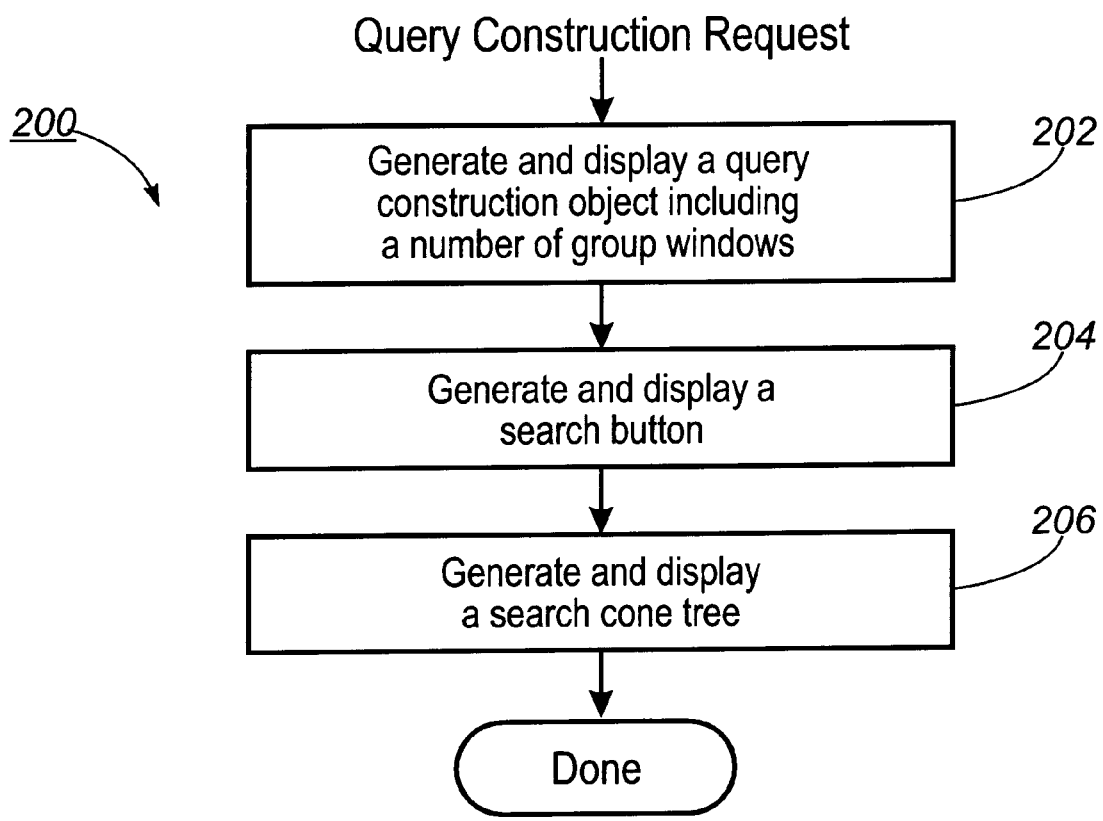
FIG. 12 illustrates instructions for generating an interactive interface for specifying search queries using a categorical hierarchy.

FIG. 12 illustrates in flow diagram form instructions 200 for generating the interactive interface for specifying search queries. Instructions 200, as well as all other instructions discussed herein, may be stored in solid state memory or on a floppy disk placed within floppy disk drive. Instructions 200, as well as all other instructions discussed herein, may be realized in any computer language, including LISP and C++.

Execution of instructions 200 begins with step 202, during which processor 31 generates a query construction object and displays it on monitor 32. The query construction object uses a book cover metaphor, which cover includes several windows, to facilitate query construction. Subsequently, during step 204, processor 31 also generates and displays on monitor 32 a search button. Preferably, the search button is displayed such that it appears to be part of the query construction object or appears very near the query construction object. By activating the search button the user signals that query construction is complete and that a search of the corpus for documents satisfying the query should begin. Finally, during step 206 processor 31 displays the Cat-a-Cone associated with the selected corpus of documents, which was previously generated during step 192. Preferably, the Cat-a-Cone is displayed near the query construction object to facilitate its use in query construction.

Figure 13:
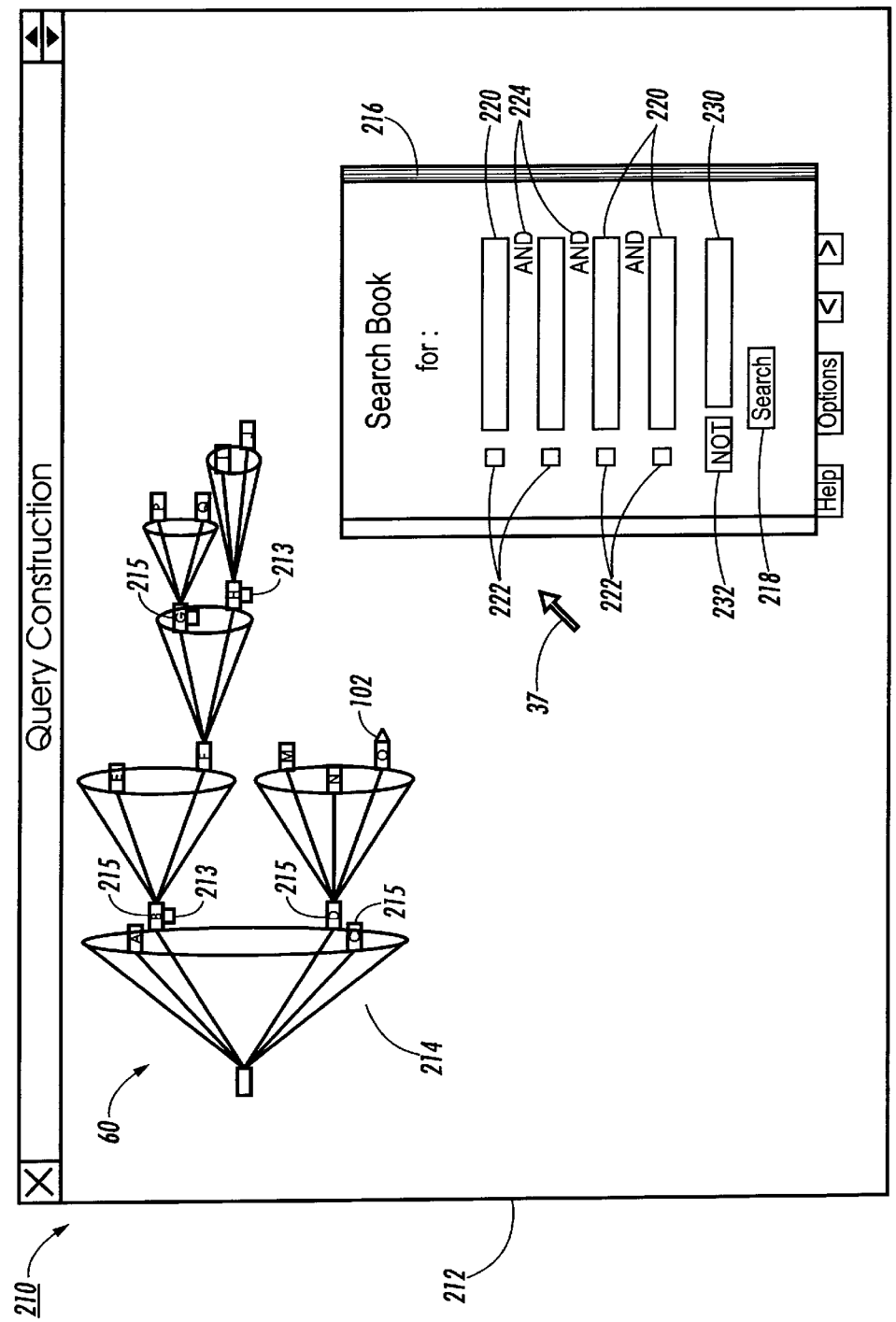
FIG. 13 illustrates an interactive interface for query construction.

FIG. 13 illustrates the interactive interface for query construction 210 as displayed on monitor 32. Interface 210 is presented as a window 212 including Cat-a-Cone 214, query construction object 216 and search button 218. Cat-a-Cone 214 is a cone tree whose leaves 215 have been labeled with the categories of a categorical hierarchy, for example, as A, B, C, D, etc. For simplicity, category leaves 215 will be referred to simply as categories. Thus, Cat-a-Cone 214 provides a representation of the categorical hierarchy that is perceptible both as three-dimensional and as separate from the collection of machine-readable documents with which it is associated. Each category 215 of Cat-a-Cone 214 has an associated query selection unit 213, which allows a user to select the associated category as a query term by "clicking on" the query selection unit.

Query construction object 216 uses a book cover metaphor. According to this metaphor, the user determines the title on the cover of a SearchBook by constructing a Boolean query that may include terms found in the documents of the corpus to be searched, as well as categories represented by Cat-a-Cone 214. Use of Cat-a-Cone 214 allows easy specification of multiple disparate categories to be included, in or excluded from, the query. Query construction object 216 includes several group objects 220, which have the appearance of small windows or slots. Each group object 220 groups together text terms and/or categories selected by the user that are to be treated as disjuncts.

A group object 220 can be activated to allow input of members in a variety of ways. A user may click on a group object 220 or its associated selection unit 222. Once a group object 220 is activated, text terms (that is terms to be searched for in document text) input via keyboard via will be displayed in the group object 220. A category label 215 be selected as a group member by activating the associated query selection unit 213 while the desired group object 220 is activated. All of the descendent or children categories of a category 215 are included as group members if those children are displayed at the time of the category's selection. On the other hand, if a category's grow tab 102 is displayed and none of its children are, then none of the children categories will be included as members of a group in which the parent is selected.

Query construction object 216 visually indicates that the query constructed with it will be a conjunction of disjuncts via display of the word "AND" 224 in between adjacent group objects 220. Other symbols, such as "&" can be used also to indicate visually that the disjuncts defined by group objects 220 will be conjoined.

Query construction 216 includes a NOT group object 230, which like objects 220 has the appearance of a slot or window. The function of NOT group object 230 is visually indicated via its selection object 232, which includes the word "NOT." Alternately, the function of NOT group object could be indicated via other symbols indicative of exclusion, such as "X". By grouping terms and categories in NOT group object 230, the user indicates that documents including the member terms and associated with the member categories should not be returned in response to the query.

Preferably, each group object 220 and its selection unit is associated with a unique color, to allow users to quickly visually distinguish between the different groups of the search query. In this embodiment, when a category 215 has been selected for inclusion in a group 220 its query selection unit 213 is then displayed in the color associated with that group. Alternately, each group object 220 and its associated selection unit 222 may be associated with a unique visual symbol. In this embodiment, when a category 215 has been selected for inclusion in a group 220 then the display of the associated query selection unit 213 includes the visual symbol unique to that group 220.

The present interactive interface also includes search button 218. Search button 218 responds to activation or a "click on it" by taking the text terms and categories associated with each group object 220, constructing a query that is a conjoining of disjuncts, and submitting that query to the associated search engine. Search button 218 may be displayed on query construction object 216 or near it.

B.2. Using the Interactive Interface for Specifying Search Queries

Figure 14:
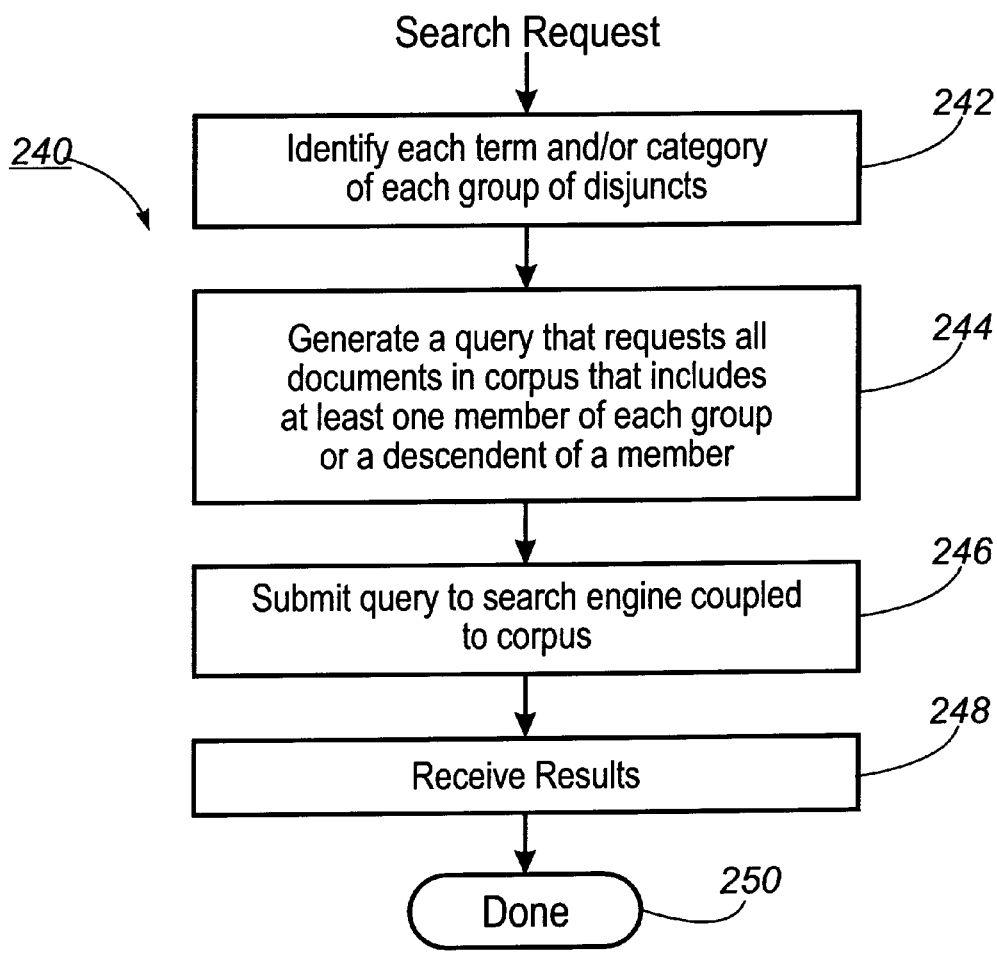
FIG. 14 illustrates instructions for using the interactive interface of the present invention to specify a search query.

FIG. 14 illustrates in flow diagram form steps 240 for using the interactive interface 210 to construct a search query. First, as shown in step 242, the user determines the number of groups 220 she wishes to be conjoined together. She then selects the disjuncts, or members, of each group 220. As discussed above, the user does so by activating a group object 220, typing in the desired text terms via keyboard 34 and by "clicking on" the desired categories 215.

After the user has identified the members of all the desired groups 220, she starts the search by "clicking on" search button 218. In response, during step 244 processor 31 constructs a query using the information associated with each of group objects 220, conjoining the two groups of disjuncts. That is to say, processor 31 constructs a request for each document that includes at least one member of each group 220 having members. That done, during step 246 processor 31 submits the query just constructed to the associated search engine, which then searches the associated corpus for documents that satisfy the constraints of the query. Upon completion of the search, the search engine returns the results to the user during step 250.

Figure 15:
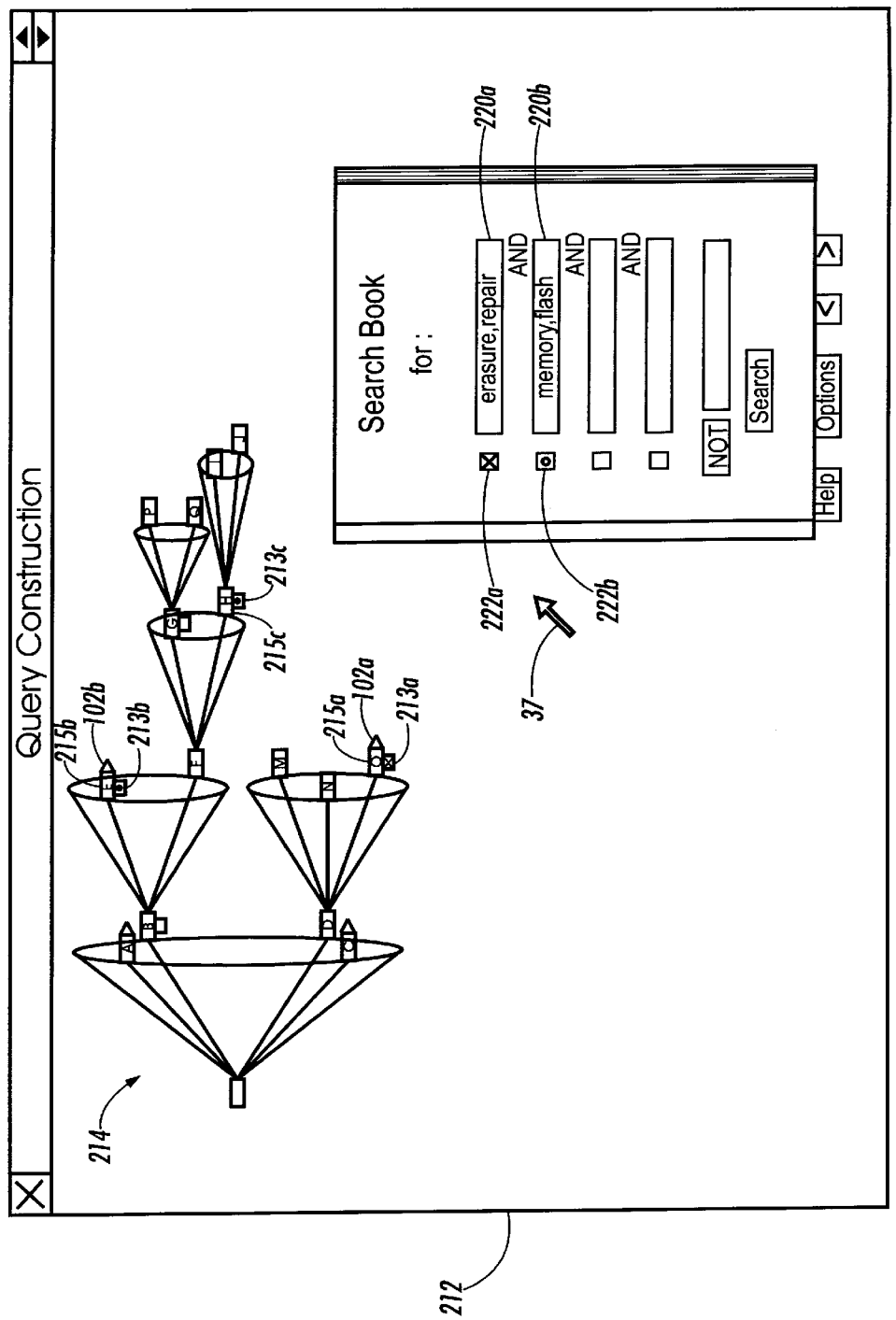
FIG. 15 illustrates the appearance of a query construction object and a Cat-a-cone after completion of query construction.

FIG. 15 illustrates the appearance of Cat-a-Cone 214 and query construction object 216 after the user has selected the members of two groups 220a and 220b. The members of group object 220a include text terms "erasure" and "repair." The members of group object 220a also include category 215a, "O", which is indicated visually by the inclusion of the symbol "x" in both query selection unit 213a and selection unit 222a. Note that none of the children categories of category 215a are selected as members of the group because grow tab 102a is displayed. (This is different than saying that documents including the children categories are not to be returned.) The members of group object 220b include text terms "memory" and "flash". The members of group object 220b also include category 215b, "E", and category 215c, "H". The interface visually indicates the inclusion of categories 215b and 215c in group object 220b by displaying the "." symbol in query selection unit 213c and selection unit 222b. Note that all of the children categories of category 215c are also member of group 220b because they are displayed rather than a grow tab.

C. Interactive Interface for Viewing Retrieval Results

Interactive interface 211 of the present invention separates, but links, the viewing and browsing retrieved documents from the viewing of an associated categorical hierarchy. Interactive interface 211 uses information visualization technology, a Cat-a-Cone, to better display a categorical hierarchy and the relationship of that hierarchy to the retrieved documents. The representation of the categories via a Cat-a-Cone, is separate from, but linked to, the representation of retrieved documents. Interactive interface 211 also uses a virtual book, called a SearchBook, to present the retrieved documents as a group. The SearchBook is a modification of U.S. Ser. No. 08/525,936 to Robertson et al. entitled "Display System for Displaying Lists of Linked Documents," previously described in the Background.

Together, the Cat-a-Cone and SearchBook provide users with a fluid, flexible two-way interaction between documents and categories. This interaction aids users by suggesting related, unanticipated category labels in their defining context. For example, a user who retrieves documents associated with the lumpectomy category can discover unexpectedly that MeSH contains categories relating to coping with the psychological distress consequent from the surgery. When the meaning of the categories associated with a document are unfamiliar to the user, she can look higher the hierarchy toward the more general, and likely more familiar, words without losing the context of the categories in the document. Interactive interface 211 also provides the user with multiple avenues for interaction. Users can click on category labels in the link page of the SearchBook and cause the corresponding category of the Cat-a-Cone to rotate to the primary viewing position. The animation of the movement of the Cat-aCone helps users retain the context of categories.

C.1. Generating the Interactive Interface for Viewing Retrieval Results

Figure 16:
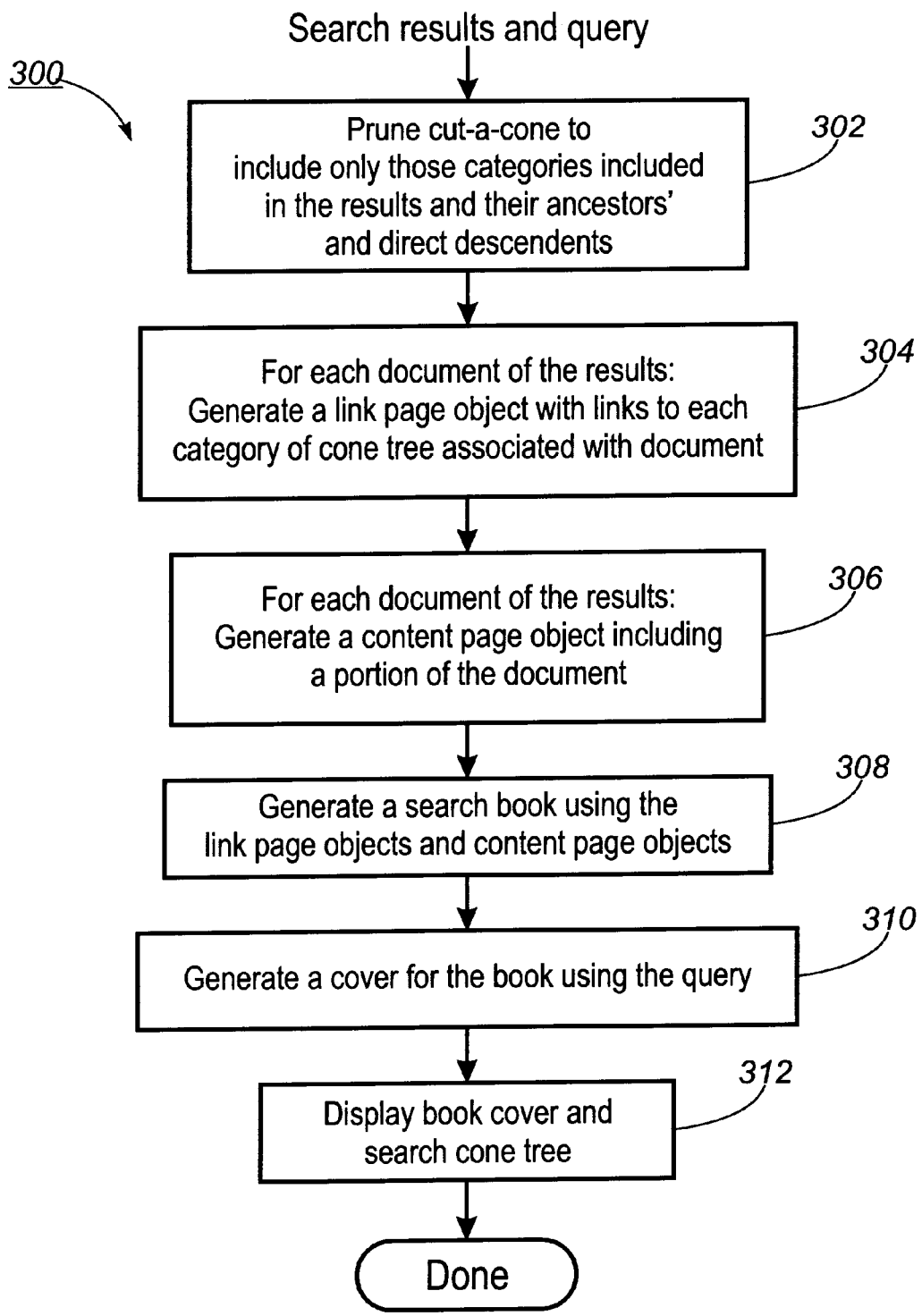
FIG. 16 illustrates instructions for generating an interactive interface for reviewing retrieval results associated with a large category hierarchy.

FIG. 16 illustrates in flow diagram form instructions 300 that enable computer system 30 to generate interactive interface 211 for viewing retrieval results. Instructions 300 assume that a Cat-a-Cone 214 has previously been generated to visually represent the relevant categorical hierarchy, as discussed previously with respect to step 206 of FIG. 12. Processor 31 responds to receipt of retrieval results from a search engine by branching to step 302.

During step 302 processor 31 first examines the documents retrieved and identifies the categories associated with each document. Processor 31 uses this information to "prune" the Cat-a-Cone 214 used during the search, thus creating retrieval Cat-a-Cone 214a. That is to say, processor 31 eliminates from the Cat-a-Cone 214 representing the entire corpus the representation of those categories that are neither ancestors, nor descendants, of the categories associated with the retrieved documents. The number of categories associated with the retrieved documents is quite likely to be greater than the number of categories in the search query when multiple category labels are associated with the documents of a corpus. In other words, if each document j has $c_j$ categories assigned to it, and the search returns $d_i$ documents, then a total of approximately $d_i*(cj-1)$ categories will be associated with the $d_i$ documents retrieved. Step 302 thus enables the interactive interface to show only the relevant categories of the Cat-a-Cone 214a while maintaining the context of those categories within the hierarchy.

Having generated a pruned Cat-a-Cone 214a, with step 304 processor 31 turns its attention to generating a visual representation of the retrieved documents, called a SearchBook. As suggested by its name, the SearchBook uses a book metaphor to organize and visually represent the documents retrieved by the search engine. The SearchBook includes two pages for each document retrieved: a link page and a content page. Each link page includes links to the categories of the Cat-a-Cone associated with a particular document, while the content page includes content from the document. To allow the SearchBook to display link pages, during step 304 processor 31 creates a link page object for each document retrieved. A link page object is a particular type of page object, which is the internal representation of a page for use in the book metaphor. During step 304 processor 31 creates an object that has the visual appearance of a page of a book upon which the category names associated with a document are listed. These category names are visually highlighted to indicate to the user that they function as links, references to the Cat-a-Cone 214a. Processor 31 may specify the links in either absolute or relative terms. A link specified in absolute terms refers to its entire Uniform Resource Locator (URL). A link specified in relative terms assumes a certain portion of the URL is the same as a reference URL. Preferably, while generating each link page object processor 31 includes the title of each document as part of the link page. Preferably, processor 31 generates each link page object so that each one appears to be a left hand page.

After completing the link page objects, processor 31 advances to step 306. Processor 31 now turns its attention to generating content page objects, one for each document retrieved. Each content page includes as much of the text of the document as possible. Preferably, if available, a summary or abstract included within the document is chosen as the content to be displayed on the associated content page. Preferably, each content page object is generated so that when displayed it appears as a right hand page.

After generating all the link page objects and content page objects, processor 31 turns its attention during step 308 to using these to generate the SearchBook. The SearchBook has a basic structure which lists the link pages, content pages and provides various controls. The SearchBook controls the display of page objects, displaying only two pages at a time—the link page and content page associated with a single document. Processor 31 completes the SearchBook in step 310 by creating a cover for the SearchBook. The cover is a single instance of a right hand page upon which is displayed the query that led the set of documents in the SearchBook to be retrieved. After completing generation of the book cover, computer system 30 displays the cover of the SearchBook and the pruned Cat-a-Cone 214a on monitor 32, enabling the user to interact with the interface. At this point, the user may open the SearchBook and begin examining the documents retrieved or the user may store the SearchBook for later examination.

C.2. The Appearance of the Interactive Interface

Figure 17:
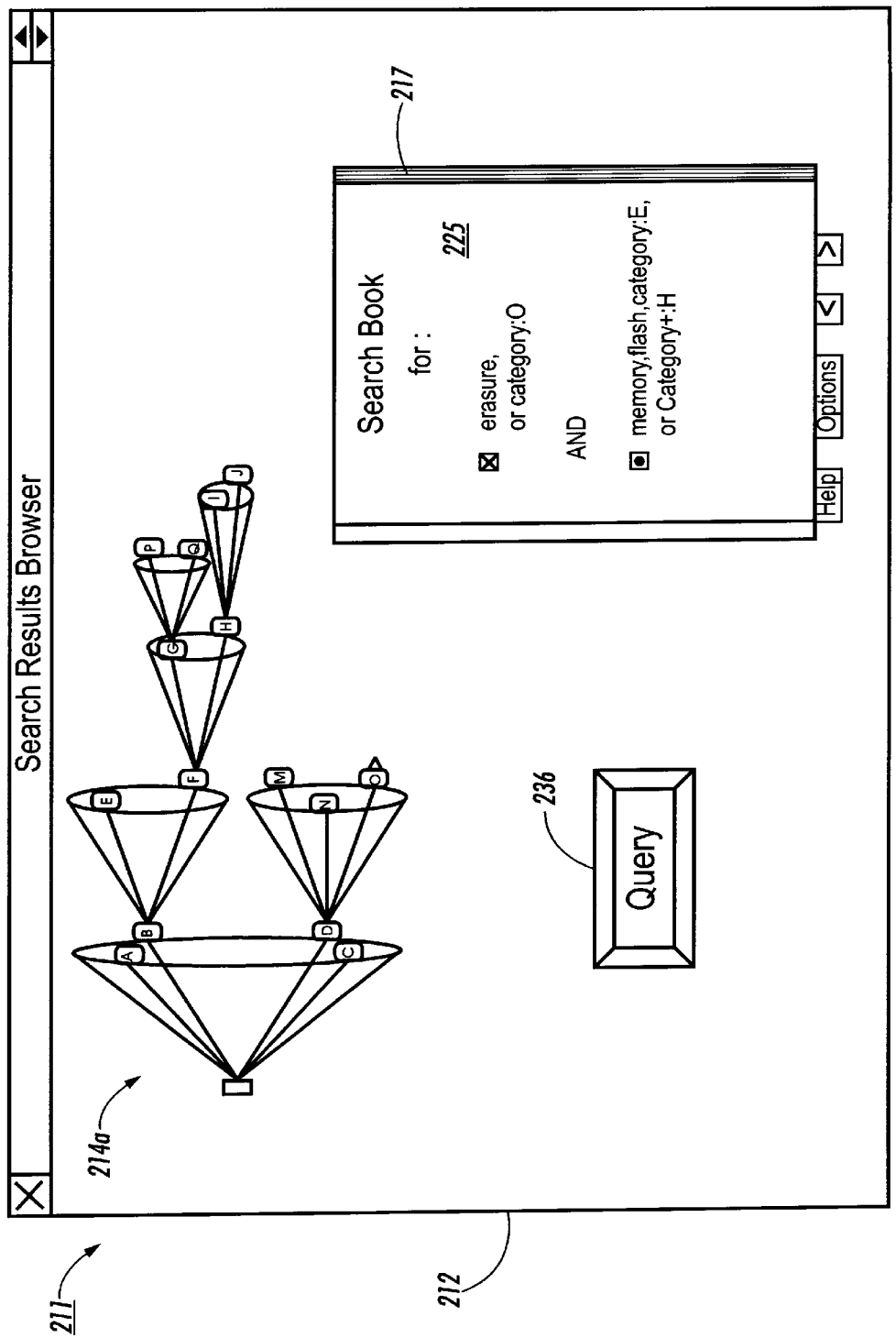
FIG. 17 illustrates the interactive interface for browsing search results associated with a category hierarchy.

FIG. 17 illustrates interactive interface 211 for browsing the search results retrieved in response to the query of FIG. 15. Interactive interface 211 includes window 212 displayed on monitor 32. Within window 212 are Cat-a-Cone 214a and SearchBook 217 with cover 225 displayed. Window 212 also includes query object 236, used to return to the interactive interface 210 for constructing queries.

Cat-a-Cone 214a has not been pruned as compared to Cat-a-Cone 214, shown in FIG. 15, because all of the categories represented are either categories associated with the documents of SearchBook 225 or ancestors of those categories. When representing larger categorical hierarchies, this will not be the case. Pruning serves a valuable function by emphasizing relevant categories while maintaining their context in the hierarchy. Cat-a-Cone 214a displays a greater number of categories than those specified in the query of FIG. 15. Five categories were included in that query: O, E, H and its descendants i and J; yet Cat-a-cone 214a represents fifteen categories. This disparity between the number of categories searched and the number represented by interactive interface 211 because all categories associated with SearchBook documents and their ancestors are displayed. The inclusion in Cat-a-Cone 214a of categories unspecified by the user aids the user by suggesting related, unanticipated categories for further refining searches. For example, if the interactive interface of the present invention were used in conjunction with the Medline corpus and its categorical hierarchy, MeSH, a user who retrieved documents associated with the lumpectomy category could discover unexpectedly that MESH contains categories relating to coping with the psychological distress consequent of the surgery. Those categories of Cat-a-Cone Cone 214a associated with the documents of SearchBook 225 are highlighted in Cat-a-Cone 214a by heavy dark lines of the boxes surrounding the category name. Other means of highlighting the categories may be used consistent with the present invention, including displaying the names of categories associated with the documents in SearchBook 217 in a different font, different color, different symbol, etc.

Visually cover 225 resembles query construction object 215 in many ways. Cover 225 of SearchBook 217 indicates that the query that generated it included two groups of disjuncts. Cover 225 preferably identifies each of the disjuncts using the colors or symbols previously used by the query construction object 216. Thus, in FIG. 17 one group is distinguished by the "X" symbol while the other is identified by the "." symbol. The members of each group are listed with categories labels indicated by the notation "category:name". When the group member was both the category and its descendants this is indicated via the notation "category+:name." Consistent with the present invention other types of notation may be used to distinguish between group members that are text terms and those that are category labels. Unlike query construction object 216, on cover 225 members of the disjunct groups are not displayed in a window or group object, such as 220a and 220b. Additionally, while mouse events within group object 220 cause processor 31 to respond in some way, processor 31 does not respond to mouse events near group members displayed on cover 225. Like query construction object 216, cover 225 indicates the disjunction between the various members of each group is indicated by including the word "OR" or an equivalent symbol in the listing of group members. Cover 225 indicates the conjoining of the two groups is indicated via the word "AND" displayed between the two group listings or an equivalent symbol.

C.3. Using the Interactive Interface to Browse Retrieval Results

Figure 18:
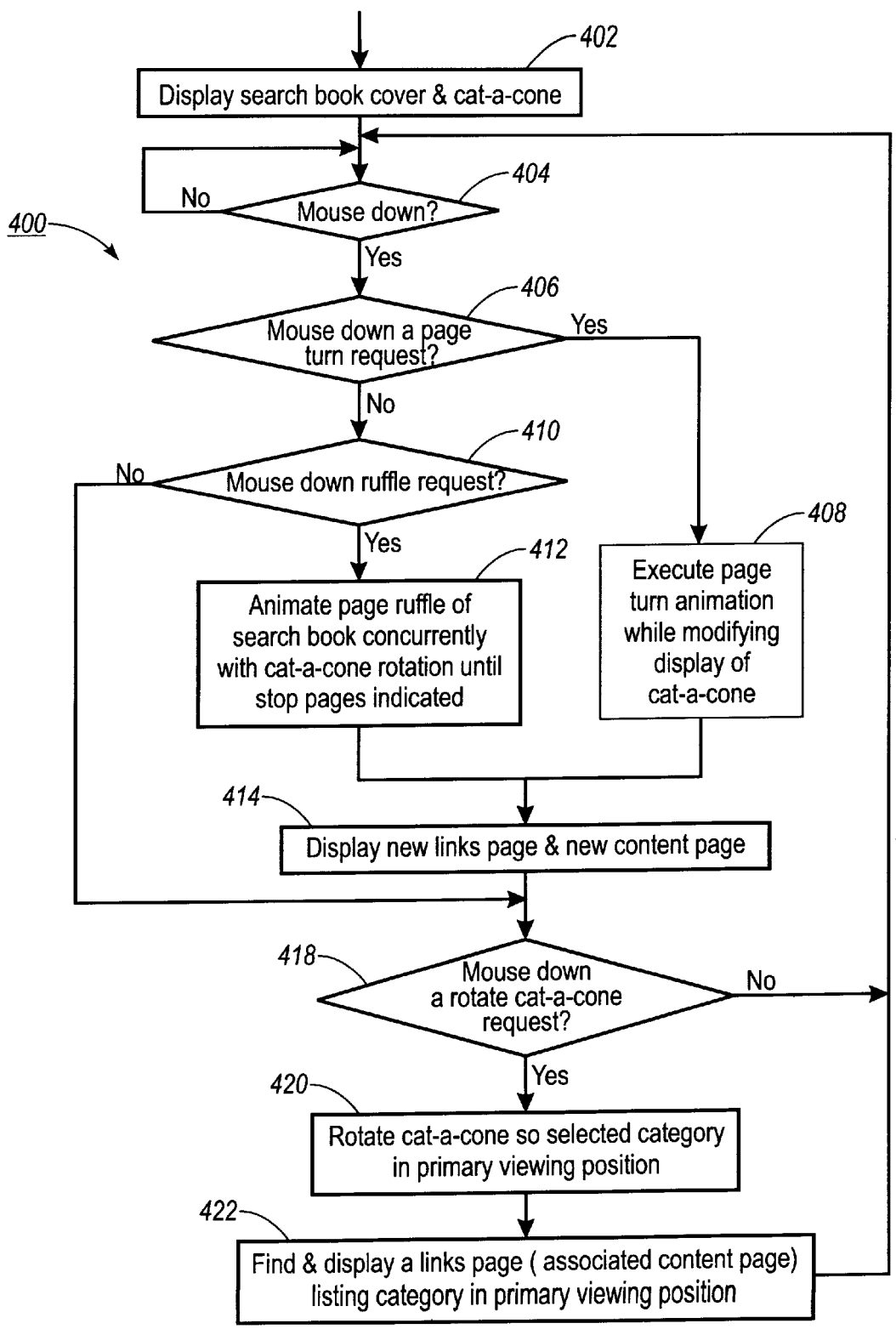
FIG. 18 illustrates instructions for browsing search results using the interactive interface of the present invention.

FIG. 18 illustrates in flow diagram form instructions 400 for browsing retrieval results using SearchBook 217 and Cat-a-Cone 214. In response to clicking on SearchBook 217 or its associated Cat-a-Cone 214, or movement of Search-Book 217 into the center of interface window 210, processor 31 advances to step 402 and displays SearchBook 217 and its associated Cat-a-Cone 214 nearby, as well as query object 236.

Once SearchBook 217 occupies the center of window 210, processor 31 advances to step 404 to await a mouse down event. Once processor 31 detects a mouse down event, it branches to step 406 to begin the process of determining what type of request that event represents. First, processor 31 examines the possibility that the user requested a page turn. That is to say, processor 31 determines: 1) whether the mouse down event occurred over cover 225 or one of the scan buttons at the bottom of cover 225; and 2) whether the mouse down event was of sufficient duration.

If the user requested a page turn, processor 31 advances to step 408 and executes page turn animation while concurrently modifying the display of Cat-a-Cone 214. During step 408, processor 31 prunes Cat-a-Cone 214a so that it displays only those categories associated with the document pages that SearchBook 217 currently displays. By animating the page turn animation, interactive interface 210 provides the user with a visual effect approximating the physical activity of turning a page in a book. Generally, the sequence of steps is to: 1) rotate the page to be turned about the axis of rotation, 2) rotate the page on the other side of the page to be turned about the axis of rotation, 3) at a point orthogonal to the viewer turn off the page to be turned and turn on the page on the other side, 4) turn off the page being covered, and 5) turn on the new page being revealed by the page turn. Implementation of page turn animation is described in greater detail in the Background.

On the other hand, if during step 406 processor 31 decides the mouse down event is too long to have been a page turn request then processor 31 advances to step 410. Processor 31 now considers whether the mouse down event has lasted a long enough time to constitute a page ruffle request. (Ruffling can be thought of as multiple concurrent page turns.) If so, processor 31 advances to step 412 and executes ruffle animation concurrently with execution of animation of a rotation of Cat-a-Cone 214. Execution of the page ruffle animation continues until processor 31 perceives a mouse up event. By executing ruffle animation processor 31 causes monitor 32 to display a plurality of SearchBook 217 pages being turned concurrently. During ruffling intermediate pages are never fully visible to the user because each page is quickly overlaid by a next page.

While processor 31 animates the ruffling of the pages of SearchBook 225, during step 412 processor 31 also animates the rotation and modification Cat-a-Cone 214a. As the pages of SearchBook 225 are moved from one side of the book to the other during the ruffle, processor 31 modifies the categories displayed by Cat-a-Cone 214 so that the categories associated with the currently displayed link page 226 are displayed. This process might be thought of as "ruffling" Cat-a-Cone 214a. Ruffling Cat-a-Cone 214a shows the user how tightly or loosely distributed the category labels are for each document retrieved by the search query and how widely distributed the categories are between the retrieved documents.

Processor 31 advances to step 414 from step 412 or step 408 in response to a mouse up event, which event indicates that the user has selected the pages to be displayed. During step 414 processor 31 causes SearchBook 217 to display the selected link page 226 and content page 228. Cat-a-Cone 214 now displays the categories listed by link page 226.

Upon reaching step 418 processor 31 now determines whether the mouse down event represented a request to rotate Cat-a-Cone 214. Processor 31 considers any mouse down event over a category of Cat-a-Cone 214a a request to rotate Cat-a-Cone 214a. If processor 31 identifies such a request, processor 31 rotates the selected category into the primary viewing position during step 420. Subsequently, during step 422 processor 31 searches SearchBook 217 for a link page 226 listing the category just moved into the primary viewing position. If processor 31 identifies such a link page, then during step 422 processor 31 causes Search-Book 217 to display that link page 226 and its associated content page 228.

Processor 31 returns to step 404 to await another mouse down event after having completed a page ruffle request, a page turn request, or a request to modify the display of Cat-a-Cone 214. Processor 31 branches through the steps of instructions 400 as longs as SearchBook 217 remains in center of window 212.

Figure 19:
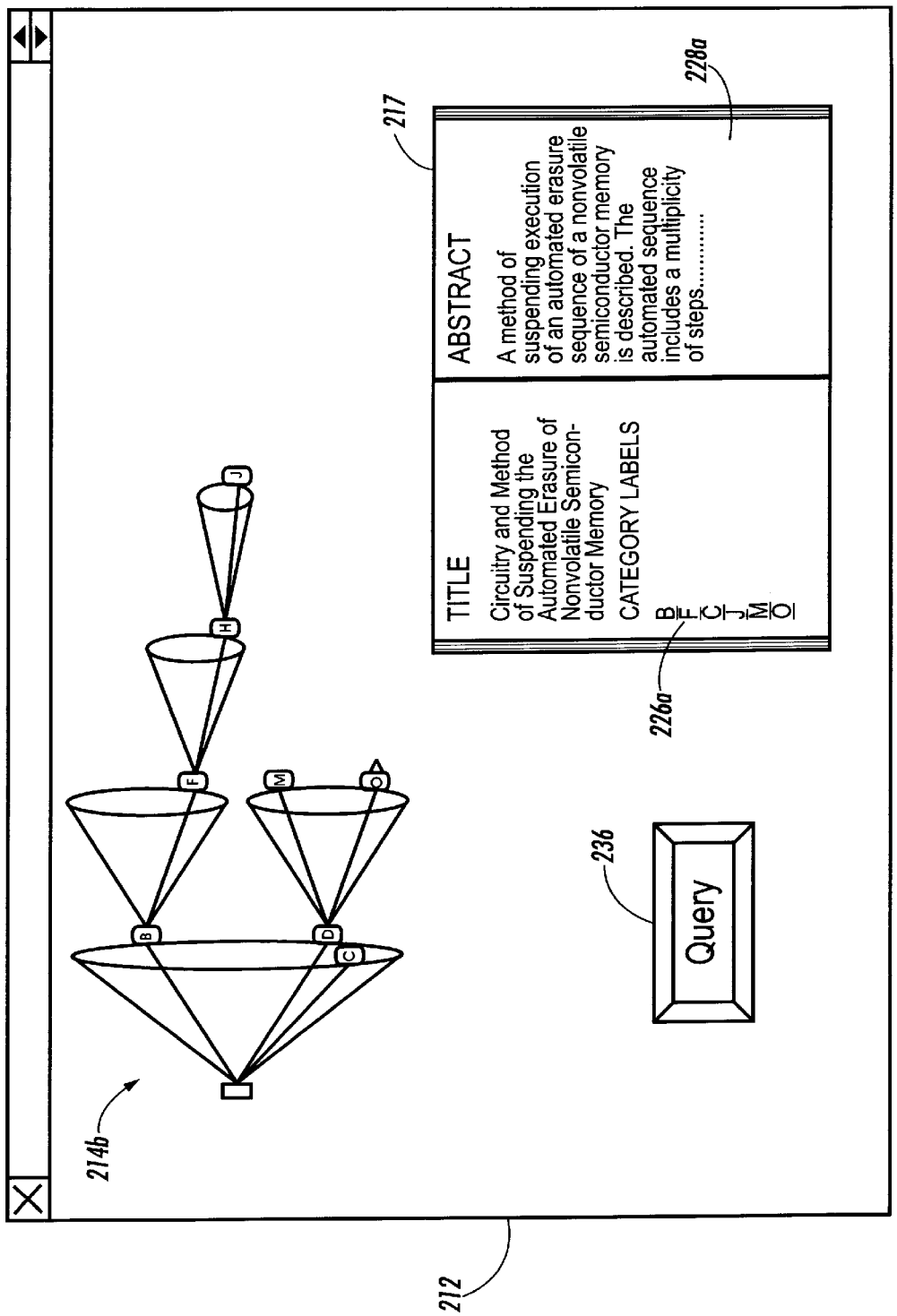
FIG. 19 illustrates the interactive interface after a SearchBook has been opened to a first pair of pages.

FIG. 19 illustrates interactive interface 211 after Search-Book 217 has been opened, either in response to a page turn or page ruffle request. Because SearchBook 217 is open, cover 225 is not displayed, and link page 226 and content page 228 are. Link page 226 includes the title of one of the documents retrieved by the search engine—in this case "Circuitry and Method of Suspending the Automated Erasure of Nonvolatile Semiconductor Memory". Link page 226 also includes a listing of the categories associated with the titled document: B, F, C, J, M, and O. Each category listed on link page 226 is underlined to indicate that each category name listed functions as a link to a category of Cat-a-Cone 214b. Other methods of indicating that a word or symbol functions as a link may be used consistent with the present invention. Content page 228a displays an abstract associated with the document whose title is listed on link page 226a. The content displayed on content page 228 helps the user identify which categories listed on link page 228 are most relevant to the search. When scroll bars are included on link page 228, the user can browse the entire text of the document.

Cat-a-Cone 214b now displays only those categories associated with link page 226a. Listing the categories as links on page 226 while simultaneously displaying the categories in their context within Cat-a-Cone 214b provides the user with multiple avenues for interaction. The user can click on a category link on link page 226 and cause the corresponding category of Cat-a-Cone 214b to rotate into the primary viewing position. The user could then expand the categories of Cat-a-Cone 214 around that category, select a new set of categories for a search and initiate the construction of a new query by "clicking" on query construction object 236.

Figure 20:
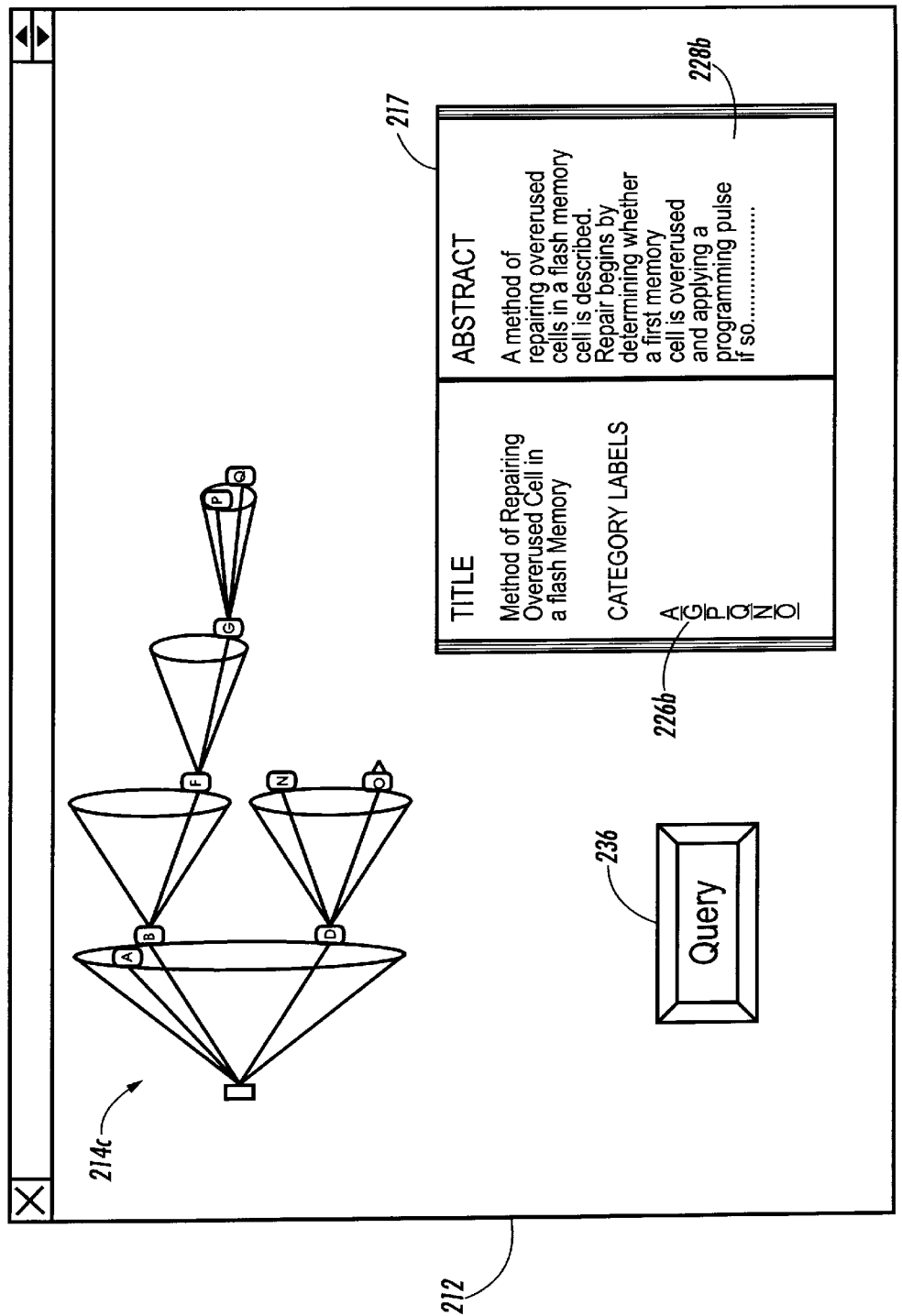
FIG. 20 illustrates the interactive interface after the SearchBook has been opened to a second pair of pages.

FIG. 20 illustrates interactive interface 211 displaying the link page 226b and content page 228b associated with yet another document retrieved in response to the query of FIG. 15. Link page 226b lists different categories than those listed by link page 226a of FIG. 19. Consequently, Cat-a-Cone 214c also displays less than all the categories of Cat-a-Cone 214a and different categories than those displayed by Cat-a-Cone 214b.

D. Conclusion

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. An interactive interface for creating a search query on a display controlled by a processor coupled to a cursor control device and to a memory storing instructions for implementing the interactive interface, the processor searching a corpus of documents in machine-readable form, each document being associated with at least one category of a category hierarchy, the interactive interface comprising:

a) a cone tree generation component for generating and displaying on the display a cone tree representing the category hierarchy, each category of the category hierarchy being represented as a node having a selection object for indicating inclusion of the category in a one of a first group and a second group, each selection object being responsive to the cursor control device;

b) a query specification component generating and displaying on the display a query specification object including a first group object and a second group object, each group object being responsive to the cursor control device and for indicating members of the group, each group including a one of a term to be searched for within the corpus and a category of the category cone tree;

c) a begin search component for generating and displaying on the display a begin search object responsive to the cursor control device, the begin search component responding to the cursor control device by indicating that the query is complete; and d) a query generation component coupled to the begin search object, the query specification component and the corpus, the query generation component generating a query for all documents in the corpus and that include at least one member of the first group and at least one member of the second group.

2. In a computer system including a display, a cursor control device, and a processor executing instructions stored in memory, a computer implemented method of specifying a search query over a corpus of machine-readable documents, each document of the corpus being associated with at least one category of a category hierarchy, the method comprising:

a) generating and displaying on the display a category cone tree visually representing the category hierarchy, each category of the category hierarchy being represented as a node having a selection object for indicating inclusion of the category in a one of a first group and a second group, each selection object being responsive to the cursor control device;

b) generating and displaying on the display a query specification object including a first group object and a second group object, each group object being responsive to the cursor control device and for indicating members of the group, each group including a one of a term included within the corpus and a category of the category cone tree;

c) generating and displaying on the display a begin search object responsive to the cursor control device to indicate the query specification is complete;

d) responding to indication via the cursor control device that the query specification is complete by generating a query for all documents in the corpus that include at least one member of the first group and at least one member of the second group.

* * * * *